US008446492B2

(12) United States Patent
Nakano et al.

(10) Patent No.: US 8,446,492 B2
(45) Date of Patent: May 21, 2013

(54) IMAGE CAPTURING DEVICE, METHOD OF SEARCHING FOR OCCLUSION REGION, AND PROGRAM

(75) Inventors: Mikio Nakano, Wako (JP); Takayuki Nagai, Kawasaki (JP); Akira Mizutani, Hamamatsu (JP); Tomoaki Nakamura, Tama (JP); Kotaro Funakoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 271 days.

(21) Appl. No.: 12/964,116

(22) Filed: Dec. 9, 2010

(65) Prior Publication Data

US 2011/0141306 A1    Jun. 16, 2011

Related U.S. Application Data

(60) Provisional application No. 61/285,266, filed on Dec. 10, 2009.

(51) Int. Cl.
*H04N 9/68* (2006.01)
*H04N 13/00* (2006.01)
*G06K 9/00* (2006.01)

(52) U.S. Cl.
USPC ............................. 348/236; 348/43; 382/254

(58) Field of Classification Search
USPC ................... 348/234–236, 148, 43; 382/154
See application file for complete search history.

(56) References Cited

U.S. PATENT DOCUMENTS

| | | |
|---|---|---|
| 2010/0195716 A1* | 8/2010 | Klein Gunnewiek et al. ................... 375/240.08 |
| 2011/0063420 A1* | 3/2011 | Masuda ........................... 348/50 |
| 2011/0064299 A1* | 3/2011 | Zhang et al. .................. 382/154 |
| 2011/0142289 A1* | 6/2011 | Barenbrug et al. ........... 382/107 |
| 2011/0164832 A1* | 7/2011 | Yoon et al. ..................... 382/294 |
| 2011/0285910 A1* | 11/2011 | Bamji et al. .................... 348/631 |
| 2012/0044322 A1* | 2/2012 | Tian et al. ........................ 348/43 |
| 2012/0076361 A1* | 3/2012 | Fujiyoshi ....................... 382/103 |
| 2012/0237114 A1* | 9/2012 | Park et al. ...................... 382/154 |
| 2012/0262607 A1* | 10/2012 | Shimura et al. ............... 348/239 |

OTHER PUBLICATIONS

Lindner, M.; Kolb, A.; Hartmann, K., "Data-Fusion of PMD-Based Distance-Information and High-Resolution RGB-Images"; Signals, Circuits and Systems, 2007. ISSCS 2007. International Symposium on , vol. 1, no., pp. 1,4, Jul. 13-14, 2007.*

Lindner, M.; Kolb, A.; Hartmann, K., "Data-Fusion of PMD-Based Distance-Information and High-Resolution RGB-Images," Signals, Circuits and Systems, 2007. ISSCS 2007. International Symposium on, vol. 1, No. pp. 1, 4, Jul. 13-14, 2007.*

(Continued)

*Primary Examiner* — Tuan Ho
*Assistant Examiner* — Shahbaz Nazrul
(74) *Attorney, Agent, or Firm* — Nelson Mullins Riley & Scarborough LLP; Anthony A. Laurentano

(57) ABSTRACT

An image capturing device is equipped with an external parameter estimating unit for estimating external parameters using a distance image obtained by a TOF camera and a luminance image obtained by a CCD camera, a corresponding pixel determining unit for determining a correspondence relationship between pixel positions in the distance image and pixel positions in the luminance image, using previously stored internal parameters of the TOF camera and the CCD camera or the CCD camera, and the external parameters, and an occlusion searching unit for searching for an occlusion region in the distance image, using the correspondence relationship between pixel positions in the distance image and pixel positions in the luminance image.

7 Claims, 23 Drawing Sheets

OTHER PUBLICATIONS

Bartczak, Bogumil et al., "Integration of a Time-of-Flight Camera into a Mixed Reality System for Handling Dynamic Scenes, Moving Viewpoints and Occlusions in Real-Time," Proceedings of the 3DPVT Workshop (2008).

Beder, Christian et al., "Real-Time Estimation of the Camera Path from a Sequence of Intrinsically Calibrated PMD Depth Images," The International Archives of the Photogrammetry, Remote Sensing and Spatial Information Sciences, vol. XXXVII. Part B3a, Beijing, China, pp. 45-50 (2008).

Forsyth, David A. et al., "Stereopsis," Computer Vision, A Modern Approach, Prentice Hall, Upper Saddle River, New Jersey, Chpt. 11, pp. 234-235 (2003).

Fuchs, Stefan et al., "Extrinsic and Depth Calibration of ToF-cameras," IEEE Conference on Computer Vision and Pattern Recognition (2008).

Gokturk, Salih Burak et al., "3D Head Tracking BAsed on Recognition and Interpolation Using a Time-Of-Flight Depth Sensor," Proceedings of the 2004 IEEE Computer Society Conference on Computer Vision and Pattern Recognition (CVPR'04) (2004).

Hansen, Dan Witzner et al., "Cluster Tracking with Time-of-Flight Cameras," IEEE Computer Society Conference on Computer Vision and Pattern Recognition Workshops CVPRW'08, pp. 1-6 (2008).

Kanezaki, Asako et al., "The development of Color CHLAC features for object exploration in 3D map," Journal of the Robotics Society of Japan, vol. 27(7):749-758 (2009).

Kim, Young Min et al., "Design and Calibration of a Multi-view TOF Sensor Fusion System," IEEE Computer Society Conference on Computer Vision and Pattern Recognition Workshops CVPRW'08, pp. 1-7 (2008).

Lindner, Marvin et al., "Data-Fusion of PMD-Based Distance-Information and High-Resolution RGB-Images," IEEE Int. Sym. on Signals, Circuits & Systems (ISSCS), session on Algorithms for 3D TOF-cameras, vol. 1:121-124 (2007).

May, Stefan et al., "3D Pose Estimation and Mapping with Time-of-Flight Cameras," IEEE/RSJ International Conference on Intelligent Robots and Systems (IROS), Workshop on 3D Mapping (2008).

Oggier, Thierry et al., "Miniature 3D TOF Camera for Real-Time Imaging," Perception and Interactive Technologies, E. Andre (Ed.), Lecture Notes in Computer Science, Springer-Verlag, Berlin, vol. 4021:212-216 (2006).

Ohno, Kazunori et al., "Real-Time Robot Trajectory Estimation and 3D Map Construction using 3D Camera," Proceedings of the 2006 IEEE/RSJ International Conference on Intelligent Robots and Systems, pp. 5279-5285 (2006).

* cited by examiner

FIG. 13

| $(u_1, v_1)$ | $(u_2, v_1)$ | $(u_3, v_1)$ | $(u_4, v_1)$ | $(u_5, v_1)$ | |
|---|---|---|---|---|---|
| $(u_1, v_2)$ | $(u_2, v_2)$ | $(u_3, v_2)$ | $(u_4, v_2)$ | $(u_5, v_2)$ | |
| $(u_1, v_3)$ | $(u_2, v_3)$ | $(u_3, v_3)$ | $(u_4, v_3)$ | $(u_5, v_3)$ | |
| $(u_1, v_4)$ | $(u_2, v_4)$ | $(u_3, v_4)$ | $(u_4, v_4)$ | $(u_5, v_4)$ | |
| $(u_1, v_5)$ | $(u_2, v_5)$ | $(u_3, v_5)$ | $(u_4, v_5)$ | $(u_5, v_5)$ | |
| | | | | | |

IMAGE CAPTURING DEVICE, METHOD OF SEARCHING FOR OCCLUSION REGION, AND PROGRAM

CROSS-REFERENCE TO RELATED APPLICATION

This application is based upon and claims the benefit of priority from U.S. Provisional Patent Application No. 61/285,266 filed on Dec. 10, 2009, and is related to Japanese Patent Application No. 2010-275199 filed on Dec. 10, 2010, which also claims priority to U.S. Provisional Patent Application No. 61/285,266, the contents of which are incorporated herein by reference.

BACKGROUND OF THE INVENTION

1. Field of the Invention

The present invention relates to an image capturing device having a TOF camera and a CCD camera, an occlusion region searching method, and a program.

2. Description of the Related Art

In the field of computer vision, particularly robot vision, the use of three-dimensional information is very important as described in a document by D. A. Forsyth, J. Ponce, "A Modern Approach", Computer Vision, Prentice Hall, 2002. For example, it is essential for autonomous robots, which recognize objects, make decisions, and perform tasks in real space, to have a function to perform three-dimensional recognition in real time in the environment in which they are present, such as shapes and motions of objects around them, just like human beings.

In recent years, the progress of three-dimensional measurement technology is remarkable, and there have been proposed various techniques related to three-dimensional measurement technology. The proposed techniques are generally classified into techniques which employ passive sensors and techniques which employ active sensors. The former class of techniques is referred to as a multi-view measurement technique typified by a stereographic technique involving a plurality of CCD cameras. Particularly, a baseline stereographic technique involving two cameras arranged parallel to each other is widely used in the art at present. However, it is generally not easy to restore three-dimensional information from two-dimensional information which is dimensionally-reduced. In particular, the restoration of three-dimensional information from multi-view image information needs to perform a task of searching for corresponding points between images and finds it difficult to fully avoid a large reduction in accuracy due to wrong corresponding points. Furthermore, it is impossible in principle to measure the distance between objects of reduced texture. It is also computationally expensive to search for corresponding points.

The latter class of techniques is advantageous in that active sensors such as laser range finders are less susceptible to illumination and are capable of measuring distances at higher speeds with higher accuracy than stereographic cameras. However, three-dimensional laser range finders are not suitable for use in applications such as home robots because they are large by themselves and very expensive. A process of obtaining highly accurate three-dimensional information by actuating a two-dimensional laser range finder with motors is often used for environmental mapping in mobile robots. However, since the two-dimensional laser range finder is moved by motors, the robot needs to keep still each time the two-dimensional laser range finder performs a scanning process. One active sensor which has been proposed to solve the above problem is an infrared TOF (Time Of Flight) camera as disclosed in a document by T. Oggier, F. Lustenberger and N. Blanc, "Miniature 3D TOF Camera for Real-Time Imaging", in Proc. of Perception and Interactive Technologies, 2006. pp. 212-216, June 2006. Such an infrared TOF camera is capable of acquiring three-dimensional information at a rate of about 30 fps according to TOF measurements using a modulated near-infrared radiation. Although the infrared TOF camera is greatly lower in accuracy than the laser range finder, it is much higher in accuracy than baseline stereographic cameras, and the infrared TOF camera is considered to be useful in many applications. Since the infrared TOF camera is relatively small, it can easily be installed on mobile robots for home use. One general problem of an active sensor is that it cannot acquire color information of acquired coordinates.

SUMMARY OF THE INVENTION

The present invention relates to an image capturing device for acquiring information such as colors, textures, etc., with CCD cameras and acquiring highly accurate three-dimensional information with a TOF camera, and combining the acquired information thereby to measure environmental information at a high speed with high accuracy, and also relates to a program for controlling such an image capturing device. In this case, it is important to calibrate the CCD cameras and the TOF camera. According to the present invention, the CCD cameras and the TOF camera are calibrated by estimating internal parameters of the CCD cameras and the TOF camera, and estimating external parameters using luminance images generated thereby.

Another important issue to deal with is occlusion. Since a TOF camera and a CCD camera have different viewpoints, a point that is observed by the TOF camera may not be observed by the CCD camera. The present invention proposes an occlusion searching method for searching for an occlusion region at high speeds. According to the present invention, two CCD cameras are used so that missing information derived from an occlusion with respect to one of the CCD cameras is compensated for with information acquired by the other CCD camera. Therefore, it is possible to obtain color information and highly accurate three-dimensional information simultaneously in real time.

According to the present invention, furthermore, an image processing system employing a TOF camera and CCD cameras is realized, and is actually installed on a robot for system evaluation. More specifically, an example of object extraction, learning, and recognition, and the generation of a three-dimensional map with a robot will be illustrated. Attention has been paid to TOF cameras for several years, and their applications in various fields have been studied. According to a document by K. Ohno, T. Nomura and S. Tadokoro, "Real-time Robot Trajectory Estimation and 3D Map Construction using 3D Camera", in Proc. of IEEE/RSJ Int. Conf. on Intelligent Robots and Systems, pp. 5279-5285, October 2006, a TOF camera is used to generate a three-dimensional map with a rescue robot. According to a document by S. May, D. Droeschel, D. Holz, C. Wiesen and S. Fuchs, "3D Pose Estimation and Mapping with Time-of-Flight Cameras", in Proc. of IEEE/RSJ Int. Conf. on Intelligent Robots and Systems, October 2008, and a document by C. Beder, I. Schiller and R. Koch, "Real-Time Estimation of the Camera Path from a Sequence of Intrinsically Calibrated PMD Depth Images", in Proc. of the International Archives of the Photogrammetry, Remote Sensing and Spatial Information Sciences, vol. XXXVII, pp. 45-50, July 2008, a TOF camera is used to estimate a three-dimensional pose and a camera path. According to a document by S. B. Gokturk and C. Tomasi, "3D Head Tacking Based on Recognition and Interpolation Using a Time-Of-Flight Depth Sensor", in Proc. of IEEE Computer Society Conference on Computer Vision and Pattern Recognition, Vol. 2, pp. 211-217, July 2004, and a document by D. W. Hansen, M. S. Hansen, M. Kirschmeyer, R. Larsen and D. Silvestre, "Cluster tracking with Time-of-Flight cameras", in Proc. of IEEE Computer Society Conference on Computer Vision and Pattern Recognition Workshops, pp. 1-6, June 2008, the effectiveness of a TOF camera is shown by applying the TOF camera to the tracking of a head and an object. However, these studies employ only three-dimensional information obtained by a TOF camera. According to a document by B. Bartczak, I. Schiller, C. Beder and R. Koch, "Integration of a Time-of-Flight Camera into a Mixed Reality System for Handling Dynamic Scenes, Moving Viewpoints and Occlusions in Real-Time", in Proc. of International Symposium on 3D Data Processing, Visualization and Transmission, June 2008, the application of a TOF camera to virtual reality is studied. According to a document by T. Harada, A. Kanezaki and Y. Kuniyoshi, "The Development of Color CHLAC Features for Object Exploration in 3D Map", Journal of Robotics Society of Japan, vol. 27, no. 7, pp. 749-758, 2009 (in Japanese), a TOF camera is applied to three-dimensional object recognition. However, this document does not deal with calibration and occlusion, but mainly studies feature quantities of three-dimensional object recognition. Until now, there is no example wherein calibrated TOF cameras and CCD cameras are used with autonomous mobile robots for home use.

The calibration problem is studied in a document by M. Lindner, A. Kolb and K. Hartmann, "Data-Fusion of PMD-Based Distance-Information and High-Resolution RGB-Images", in Proc. of International Symposium on Signals, Circuits and Systems, vol. 1, pp. 1-4, July 2007, a document by S. Fuchs and G. Hirzinger, "Extrinsic and depth calibration of ToF-cameras", in Proc. of IEEE Conf. on Computer Vision and Pattern Recognition, pp. 1-6, June 2008, and a document by Y. Min Kim, D. Chan, C. Theobalt and S. Thrun, "Design and Calibration of a Multi-view TOF Sensor Fusion System", in Proc. of IEEE Computer Society Conference on Computer Vision and Pattern Recognition Workshops, pp. 1-7, June 2008. Many of the documents are mainly aimed at correction of distance information of a TOF camera. None of these documents deals with the occlusion problem of TOF cameras and CCD cameras.

In order to achieve the above objects, there is provided in accordance with the present invention an image capturing device comprising a distance image sensor, a luminance image sensor, an external parameter estimating unit for estimating external parameters using a distance image obtained by the distance image sensor and a luminance image obtained by the luminance image sensor, a corresponding pixel determining unit for determining a correspondence relationship between pixel positions in the distance image and pixel positions in the luminance image, using previously stored internal parameters of the distance image sensor and the luminance image sensor, and the external parameters, and an occlusion searching unit for searching for an occlusion region in the distance image, using the correspondence relationship between pixel positions in the distance image and pixel positions in the luminance image determined by the corresponding pixel determining unit.

The occlusion searching unit may scan the pixels in the distance image in one direction, and set, as a pixel position at which the occlusion starts, a pixel position of the pixels in the distance image at a time when a movement direction of pixels in the luminance image, which correspond to the pixels in the distance image, becomes opposite in direction to the one direction.

The occlusion searching unit may set, as a pixel position at which the occlusion in the one direction ends, a pixel position of pixels in the distance image immediately before the pixel position of pixels in the luminance image, which correspond to the pixels in the distance image, become on the side of the one direction from a pixel position of pixels in the luminance image immediately before the movement direction changes.

The image capturing device may further comprise a mapping unit for mapping luminance information of pixels of the luminance image, which correspond to pixels in the distance image, to distance information of pixels in the distance image outside of the occlusion region, using the correspondence relationship between pixel positions in the distance image and pixel positions in the luminance image.

The image capturing device may comprise at least two luminance image sensors, wherein the mapping unit maps to distance information of the pixels of the occlusion region in the distance image, which have been searched for by the occlusion searching unit, using the luminance image captured by one of the luminance image sensors, luminance information of corresponding pixels of the luminance image captured by the other luminance image sensor.

In order to achieve the above objects, there is provided in accordance with the present invention an occlusion region searching method implemented by a computer having a distance image sensor and a luminance image sensor, comprising the steps of estimating external parameters using a distance image obtained by the distance image sensor and a luminance image obtained by the luminance image sensor, determining a correspondence relationship between pixel positions in the distance image and pixel positions in the luminance image, using previously stored internal parameters of the distance image sensor and the luminance image sensor, and the external parameters, and searching for an occlusion region in the distance image, using the determined correspondence relationship between pixel positions in the distance image and pixel positions in the luminance image.

In order to achieve the above objects, there is provided in accordance with the present invention a program that enables a computer having a distance image sensor and a luminance image sensor to function as an external parameter estimating unit for estimating external parameters using a distance image obtained by the distance image sensor and a luminance image obtained by the luminance image sensor, a corresponding pixel determining unit for determining a correspondence relationship between pixel positions in the distance image and pixel positions in the luminance image, using previously stored internal parameters of the distance image sensor and the luminance image sensor, and the external parameters, and an occlusion searching unit for searching for an occlusion region in the distance image, using the correspondence relationship between pixel positions in the distance image and pixel positions in the luminance image determined by the corresponding pixel determining unit.

According to the present invention, because a correspondence relationship between pixel positions in the distance image and pixel positions in the luminance image is determined using previously stored internal parameters of the distance image sensor and the luminance image sensor, and the estimated external parameters, and an occlusion region in the distance image, is sought using the correspondence relationship between the pixel positions in the distance image and the pixel positions in the luminance image which have been determined, the occlusion region can be searched for, and the occlusion can be eliminated. Because the correspondence relationship between the pixel position in the distance image and the pixel positions in the luminance image is determined, a distance image in which luminance information is mapped can be obtained.

Further, pixels in the distance image are scanned in one direction, and a pixel position of the pixels in the distance image is set as a pixel position at which the occlusion starts, at a time when a movement direction of pixels in the luminance image, which correspond to the pixels in the distance image, becomes opposite in direction to the one direction. Therefore, pixels at the start of the occlusion region can be searched for highly accurately.

A pixel position of pixels in the distance image immediately before the pixel position of pixels in the luminance image, which correspond to the pixels in the distance image, become on the side of the one direction from a pixel position of pixels in the luminance image immediately before the movement direction changes is set as a pixel position at which the occlusion in the one direction ends. Therefore, the pixels at the end of the occlusion region can be searched for highly accurately.

Because, using the correspondence relationship between pixel positions in the distance image and pixel positions in the luminance image, luminance information of pixels of the luminance image, which correspond to pixels in the distance image, is mapped to distance information of pixels in the distance image outside of the occlusion region, the distance image having luminance information therein can be obtained.

At least two luminance image sensors may be provided, and the mapping unit maps to distance information of the pixels of the occlusion region in the distance image, which have been searched for using the luminance image captured by one of the luminance image sensors, luminance information of corresponding pixels of the luminance image captured by the other luminance image sensor. Therefore, the occlusion region can be compensated using the luminance information captured by the other luminance image sensor, and even in, the event that an occlusion is generated, a clean three-dimensional image can be obtained.

The above objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a view for explaining pixel positions $(u_i, v_j)$ in a luminance image;

DESCRIPTION OF THE PREFERRED EMBODIMENTS

An image capturing device according to a preferred embodiment of the present invention, in relation to a program for controlling the image capturing device and an occlusion region searching method executed by the image capturing device, will be described in detail below with reference to the drawings.

A. Camera Calibration

Figure 1:
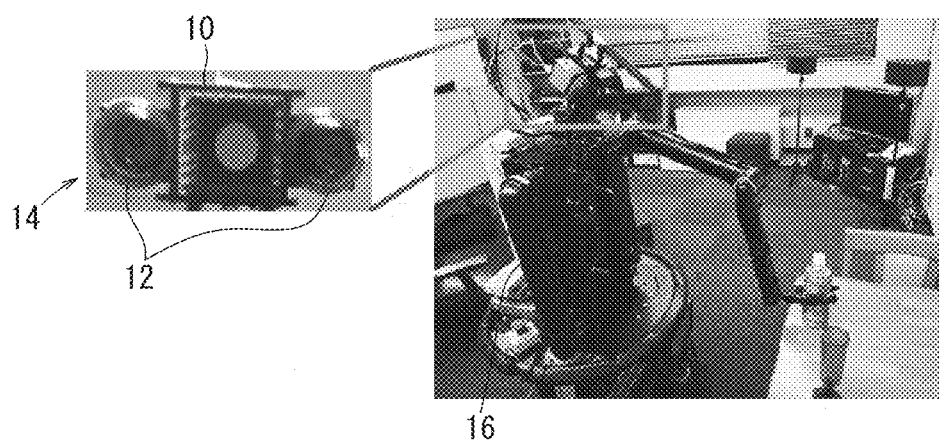
FIG. 1 is a view showing the structure of an image capturing device provided in a robot.

First, camera calibration will be described below. A TOF camera 10 is capable of acquiring highly accurate three-dimensional information at a high speed, but is problematic in that it fails to acquire color information. According to the present embodiment, as shown in FIG. 1, an image capturing device 14, which functions as a 3D sensor, is made up of a single TOF camera (sensor) 10 and two CCD cameras (sensor) 12. The image capturing device 14 is installed, for example, in an autonomous mobile robot named "DiGORO" (hereinafter referred to as robot 16). By calibrating three-dimensional information (distance data) obtained by the TOF camera 10 with color image information obtained by the CCD cameras 12, a 3D sensor, which is capable of acquiring both distance information and color information at a high speed with high accuracy, can be achieved. However, both the distance information and the color information should not be handled as independent data, but need to be combined into a single set of data. To this end, image coordinates of the CCD cameras 12, which correspond to distance information in each of pixels obtained by the TOF camera 10, are determined, and the color information is mapped to the distance information.

Generally, the CCD cameras 12 are capable of acquiring images of high resolution (e.g., 1024×768), whereas the TOF camera 10 is capable of acquiring only images of low resolution (e.g., 176×144). The CCD cameras 12 and the TOF camera 10 have mutually different geometrical characteristics including focal length, and lens distortion. When combining information obtained by different types of sensors (cameras) into a single coordinate system, therefore, on account of such problems, calibration cannot be performed merely by positioning of the sensors. Depending on the locations where the TOF camera 10 and the CCD cameras 12 are positioned, a region is developed which cannot be measured by all of the sensors. A process of combining distance information and color information into a single set of data while solving the above problems will be described below.

A-1. TOF Camera 10

The measurement of distance with the TOF camera 10 is based on a time-of-flight principle. According to the time-of-flight principle, the distance is measured from the time of flight, which is consumed after a light beam is emitted from a light source and then reflected by the object in the field of view until the reflected light beam reaches the TOF camera 10. According to the present embodiment, SR4000 manufactured by SwissRanger (see MESA Imaging, http://www.mesa-imaging.ch/index.php) is used to measure distance. SR4000 modulates a light signal emitted from an LED light source and measures the phase of the modulated light signal which is reflected from an object with a CCD/CMOS image sensor. The distance D to the object is defined by the following expression (1)

$$D = \frac{c}{2f} \qquad \text{[Expression 1]}$$

where c represents the velocity of light, which is known, and f represents the measured modulating frequency.

Since the distance is measured with respect to each of the pixels of the TOF camera 10, the TOF camera 10 can produce a distance image of 176×144 pixels.

A-2. Estimation of Parameters

For calibrating data obtained by the cameras (the TOF camera 10 and the CCD cameras 12 may also be referred to hereinafter collectively simply as cameras), parameters of the cameras first are estimated. A camera can ideally be modeled by a pinhole camera in which light passes through one point and is projected onto an image capturing surface. In a geographical calibration based on a pinhole camera model, parameters indicative of the position and posture of the camera and the characteristics of the camera are classified into external parameters (rotation and parallel translation) and internal parameters (focal length, lens distortion coefficients, optical center, and pixel size). The external parameters are representative of the position and posture of the camera in a three-dimensional space, and the internal parameters are parameters for projecting a three-dimensional space onto a two-dimensional image plane, and are representative of the characteristics of the camera itself.

Various processes have been proposed to estimate the above parameters. The image capturing device according to the present embodiment employs a calibration process by Zhang. According to the calibration process by Zhang, the cameras capture images of an object whose geographic characteristics are known from many directions, and parameters of the cameras are estimated by determining a correspondence relationship between a world coordinate system and an image coordinate system.

A-3. Mapping of Color Information

After parameters of the TOF camera 10 and the CCD cameras 12 have been determined, relative positions of the TOF camera 10 and the CCD cameras 12 are determined using the parameters. It is assumed that the TOF camera 10 and the CCD camera 12 have respective coordinate systems in positions shown in FIG. 2. If the parameter of rotation from the TOF camera 10 coordinate system $(X_1, Y_1, Z_1)$ to the CCD camera 12 coordinate system $(X_2, Y_2, Z_2)$ is represented by R, and the parameter of parallel translation from the TOF camera 10 coordinate system $(X_1, Y_1, Z_1)$ to the CCD camera 12 coordinate system $(X_2, Y_2, Z_2)$ is represented by t, then the following expressions (2) through (4) are satisfied with respect to the coordinates of a point P.

$$\begin{bmatrix} X_2 \\ Y_2 \\ Z_2 \end{bmatrix} = [R \mid t] \begin{bmatrix} X_1 \\ Y_1 \\ Z_1 \\ 1 \end{bmatrix} \qquad \text{[Expression 2]}$$

$$R = R_2 R_1^{-1} \qquad \text{[Expression 3]}$$

$$t = t_2 - R_2 R_1^{-1} t_1 \qquad \text{[Expression 4]}$$

It is assumed that lens distortions have been corrected. Based on the above relationships, the three-dimensional information of all the pixels acquired by the TOF camera 10 is converted into information in the CCD camera 12 coordinate system. The converted information is further converted into information in a CCD camera 12 image coordinate system according to the following expressions (5) and (6), and such further converted information is combined with color information of the pixels. In the following expressions (5) and (6), $f_2$ represents the focal point distance of the CCD camera.

$$u_2 = f_2 \frac{X_2}{Z_2} \qquad \text{[Expression 5]}$$

$$v_2 = f_2 \frac{Y_2}{Z_2} \qquad \text{[Expression 6]}$$

Figure 3A:
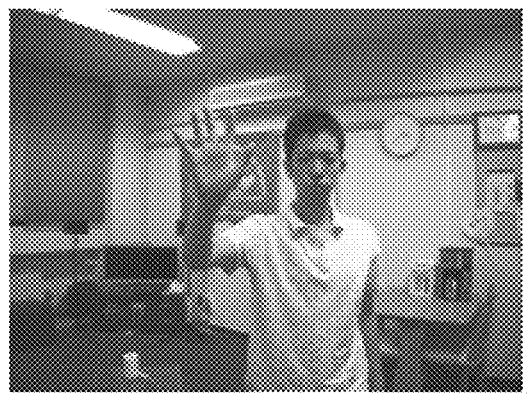
FIGS. 3A to 3C are views for explaining mapping of color information.
Figure 3B:
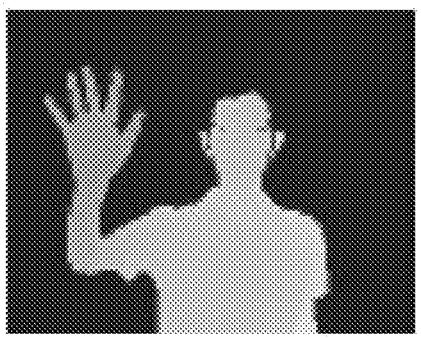
Figure 3C:

The results obtained from the above process are shown in FIGS. 3A to 3C. It is assumed that information from pixels that indicate large distances, and whose data reliability is low, is not used. In particular, FIGS. 3A to 3C are views for explaining mapping of color information, in which FIG. 3A is a color image that is shown in monochrome for purposes of the present application, FIG. 3B is a view showing depth perspective (three dimensional information) of the image shown in FIG. 3A, and FIG. 3C shows an image on which calibration and mapping have been carried out.

A-4. Occlusion

When combining information from a plurality of cameras, it is necessary to take into account a region which cannot be measured by all of the cameras, i.e., an occlusion region. There are four regions, described below, that may be taken into consideration according to the present invention.

1. a region which can be measured by both a TOF camera 10 and a CCD camera 12;
2. a region which can be measured by only a TOF camera 10;
3. a region which can be measured by only a CCD camera 12; and
4. a region which cannot be measured by either a TOF camera 10 or a CCD camera 12.

Of these regions, only the region (2) should be taken into consideration since color information acquired by a CCD camera 12 is mapped onto distance information acquired by a TOF camera 10.

Figure 4A:
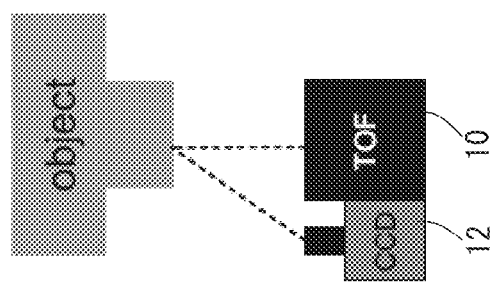
FIGS. 4A to 4C are views for explaining a generated occlusion region.
Figure 4B:
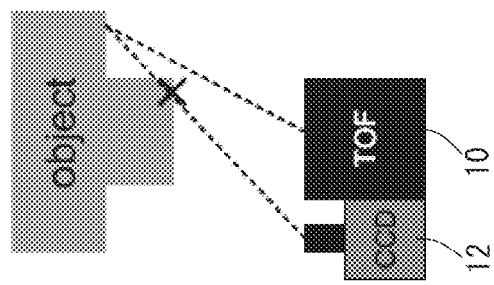
Figure 4C:
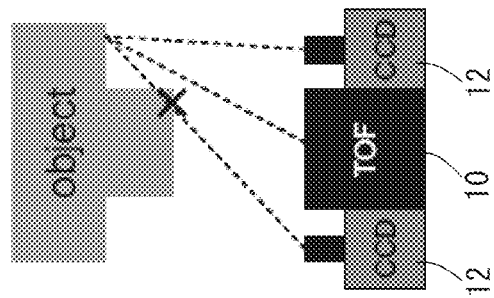

FIG. 4 show examples of occlusions. More specifically, FIGS. 4A to 4C are views for explaining an occlusion region that is generated, in which FIG. 4A is a view showing a region in which measurement by a TOF camera 10 and a CCD camera 12 can be performed, FIG. 4B is a view showing a region in which measurement by a TOF camera 10 can be performed yet measurement by a CCD camera 12 cannot be performed, and FIG. 4C is a view showing a case where a region in which measurement by a TOF camera 10 can be performed yet measurement by a given CCD camera 12 cannot be performed is supplemented by another CCD camera 12, and measurement of the region is carried out thereby.

Figure 5A:
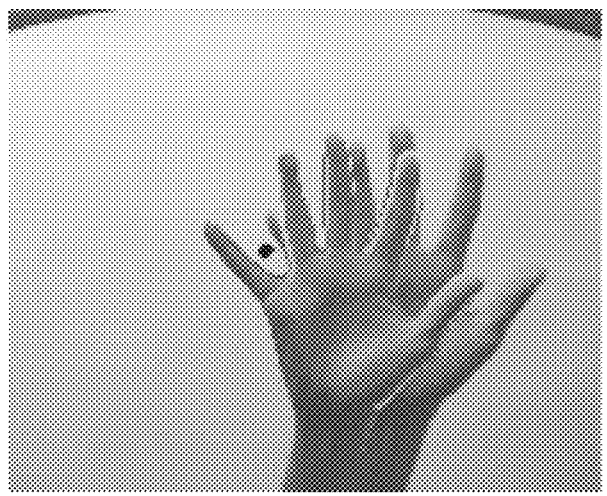
FIGS. 5A and 5B are views for explaining a technique of searching for an occlusion region.
Figure 5B:

FIG. 4B shows a region which can be measured by a TOF camera 10 but cannot be measured by a CCD camera 12. If coordinates acquired by the TOF camera 10 are converted into coordinates of the CCD camera 12, and the converted coordinates are projected into an image coordinate system, then the information of a region in the foreground is obtained. If the occlusion region is not taken into account, therefore, an image shown in FIG. 5A is generated. For removing information of this region, it is necessary to search for the occlusion region. Although one solution would be to use a Z buffer, a process of searching for an occlusion region at a higher speed is proposed according to the present embodiment. FIGS. 5A and 5B are views for explaining a technique of searching for an occlusion region, in which FIG. 5A shows an image calibrated for a case in which the occlusion region is not taken into consideration, and FIG. 5B shows an image calibrated for a case in which the occlusion region is taken into consideration.

Whether a point of interest falls within an occlusion region or not is determined when an image is scanned in a mapping process. The basic idea, for a situation in which a TOF camera 10 and a CCD camera 12 are disposed in a horizontal direction (i.e., a direction roughly parallel with respect to the ground), is based on the fact that when pixel positions of the CCD camera 12, which correspond to the pixel positions of the TOF camera 10, are horizontally scanned, the scanning spot moves necessarily in one direction, but moves in an opposite direction upon entering into an occlusion region. Stated otherwise, when the pixel positions of the TOF camera 10 are scanned horizontally (e.g., in one direction from the left to the right), the pixel positions of the CCD camera 12 that correspond to the pixel positions of the TOF camera 10 also move in the one direction, except that in an occlusion region, the pixel positions of the CCD camera 12 that correspond to the pixel positions of the TOF camera 10 move in an opposite direction. An algorithm for searching for an occlusion region will be described below. Image capturing elements of the TOF camera 10 and the CCD camera 12 are arranged such that the pixels are in rows and columns.

(1) Pixels of the CCD camera 12, which correspond to all of the pixels Nu×Nv of the TOF camera 10, are determined. It is assumed that the CCD camera 12 coordinates $(U(u_i), V(v_j))$ correspond to image coordinates $(u_i, v_j)$ of the TOF camera 10.

(2) A pixel where $U(u_i)<U(u_{i-1})$ on a $v_j$ line is searched for by incrementing the value of i. If such a pixel is found, then the process proceeds to (3). If not, then the process returns to (2). If i=Nu, then the process proceeds to (4).

(3) A pixel where $U(u_{i-1})<U(u_{i+k})$ is searched for by incrementing the value of k. If such a pixel is found, then the value of i is set to i=i+k, and the process returns to (2). If not, then the conjunction of $(u_{i+k}, v_j)$ is deleted, and the process returns to (3). If i+k=Nu, then the process proceeds to (4).

(4) The value of j is incremented, and the process returns to (2). If j=Nv, then the process is finished.

An image generated when the above algorithm is actually carried out is shown in FIG. 5B. The above algorithm is directed to searching for an occlusion region in the calibration of a left CCD camera 12 and a TOF camera 10. For the calibration of a right CCD camera 12 and a TOF camera 10, a different algorithm is applied to search for an occlusion region, wherein pixels are scanned in a direction to decrement the value of i from i=Nu.

The information of an area which cannot be acquired by the left CCD camera 12 due to an occlusion can be acquired by another CCD camera 12, i.e., the right CCD camera 12 as shown in FIG. 4C. More specifically, a point that cannot be measured by the left CCD camera 12 is compensated for by the right CCD camera 12, and conversely a point that cannot be measured by the right CCD camera 12 is compensated for by the left CCD camera 12. The information acquired by the left CCD camera 12 and the information acquired by the right CCD camera 12 are combined into complete information, and thus information with fewer missing parts is obtained.

B. Applications to Image Processing

Figure 6A:
FIGS. 6A and 6B are views showing a test environment and a robot.
Figure 6B:
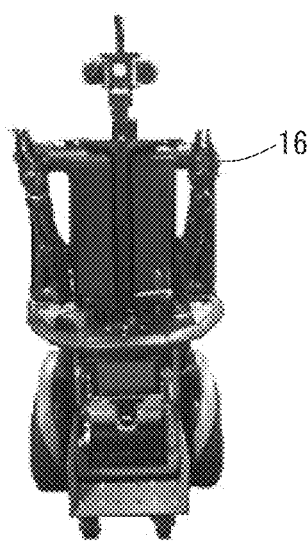

A robot 16 operates in a general living room shown in FIG. 6A where all experiments are carried out. Image processing details of the image capturing device 14 will be described below. FIGS. 6A and 6B are views showing a test environment and a robot 16. FIG. 6A shows a living room in which the robot 16 is operated under test, whereas FIG. 6B shows the robot 16 under use in an experiment.

B-1. Detection of an Unknown Object

In order to acquire information of an object, it is necessary to extract only the object in question from the scene. However, when an unknown object is to be extracted, prior knowledge of shape and color of the object is not available. Therefore, it is difficult to detect such an unknown object in a complex background, since an object region and a non-object region are not distinguishable from each other. Such an object is detected according to two processes using information acquired by the TOF camera 10 and the two CCD cameras 12.

B-1-1. Detection of an Object Based on Motion Attention

The visual system is given prior knowledge that a mass moving within the field of view is an object, thereby making it possible to detect the object from the background. This concept is based on application of the selective visual attention of a human being to information processing. Specifically, a region (initial region) of interest in an input image is detected from image information which is obtained by inter-frame differences between frames in which color information is mapped to distance information. The initial region of interest is merely a moving region in the image and does not represent an accurate object contour. Nevertheless, the initial region is highly likely to include an object of interest and contain useful information in the initial region. A histogram f(d) of distances in the initial region and a histogram g(h) of hues in the region are acquired and handled as respective probability density functions, and maps representative of probabilities of the object with respect to a distance image D(x, y) and a hue image H(x, y) are generated. A distance object probability map $P_D$, and a hue object probability map $P_H$ are expressed in the following expressions (7) and (8).

$$P_D(x,y)=f(D(x,y)) \quad \text{[Expression 7]}$$

$$P_H(x,y)=g(H(x,y)) \quad \text{[Expression 8]}$$

The two probability maps are weighted by respective weighting coefficients $w_d$, $w_h$, and then are added to each other, in order to produce a final object probability map $P_o$, shown below in expression (9), for the detection of an object. The weighting coefficients are automatically adjusted by dispersion of the respective information.

$$P_O(x,y)=LPF[w_d \times P_D(x,y)+w_h \times P_H(x,y)] \quad \text{[Expression 9]}$$

Figure 7:
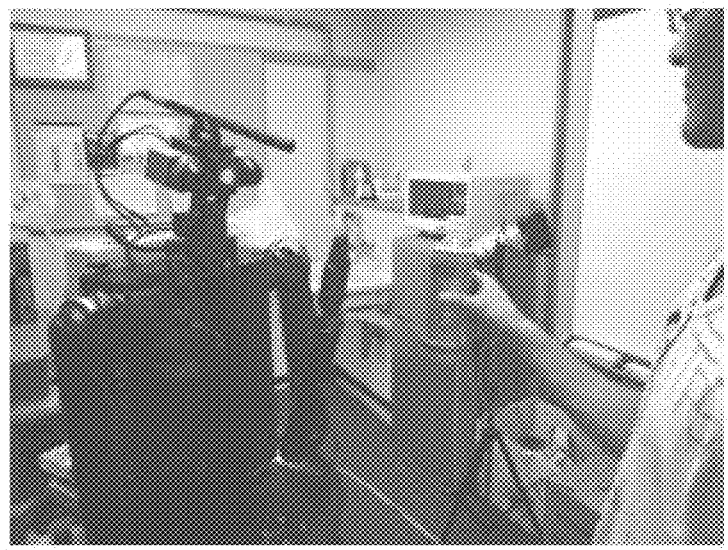
FIG. 7 is a view showing object teaching of the robot shown in FIG. 6B.
Figure 8:
FIG. 8 is a view showing objects used for experiments.
Figure 9A:
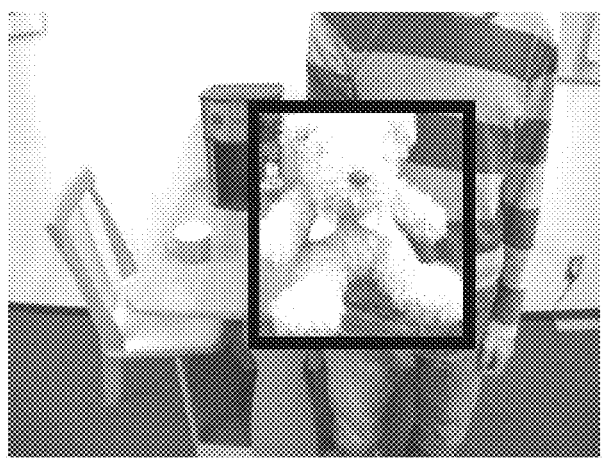
FIGS. 9A and 9B are views for explaining detection of an object by movement.
Figure 9B:
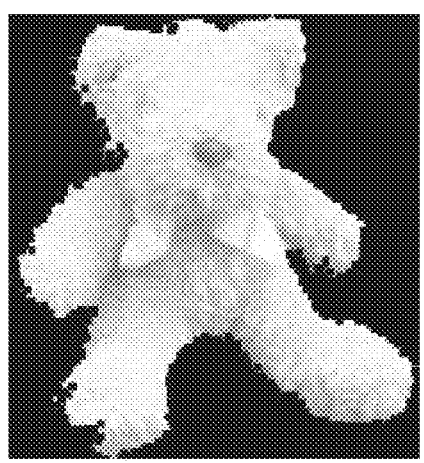

An experiment conducted to evaluate the accuracy of an object detecting process will be described below. In the experiment, an unknown object was shown by a user to the robot 16 in the living room while moving the object, as shown in FIG. 7. There were used a total of 50 general objects shown in FIG. 8 in the experiment. The robot 16 acquired an image of 50 frames of each object from the time the user started to show the object to the robot, and clipped an object of interest from the image during acquisition of the image. An object detected based on motion attention is shown in FIG. 9. Clips from the frames were classified into six patterns, shown below, and evaluated. FIGS. 9A and 9B are views for explaining detection of an object by movement, in which FIG. 9A shows an object region, which is detected by the robot shown in FIG. 6B, and FIG. 9B shows an object actually detected by the robot shown in FIG. 6B.

[1] A clip extracts 90% or more of the object region.
[2] A clip includes a small region other than the object region.
[3] A clip partially lacks the object region.
[4] A clip includes a large region other than the object region.
[5] A clip largely lacks the object region.
[6] A clip extracts a region different from the object region.

The patterns [1] through [3] were evaluated as successful clips since they were sufficient to obtain information of the object, whereas the other patterns were evaluated as failure clips. The results of the experiments are shown in Table 1 below.

TABLE 1

| | Object Detection Rate | | | | | |
|---|---|---|---|---|---|---|
| | (1) | (2) | (3) | (4) | (5) | (6) |
| Proposed sensor (%) | 71.8 | 1.8 | 24.2 | 2.5 | 0 | 0 |
| Stereo camera (%) | 31.6 | 30.9 | 18.1 | 8.2 | 5.3 | 5.9 |

Numbers [1] through [6] in Table 1 correspond to the patterns of the classified clips. When the stereo camera was used, accuracy variations occurred depending on the object; for example, the detected region included a large background portion, the detected region lacked a large portion of the object, etc. However, the new visual system incorporating the proposed 3D sensors extracted the object regions stably at a success rate of 97.5%. Since the TOF camera 10 measures the distance to an object based on the time after emission of infrared radiation until reflection thereof back to the sensor, the TOF camera 10 may fail to accurately measure the distance to a label-free transparent portion of a PET bottle or a black portion of an object.

B-1-2. Detection of an Object Based on Plane Detection

An object can be detected based on the assumption that the object is supported on a planar surface. A plane in a three-dimensional space is represented by three parameters, i.e., an angle θ to an x-axis, an angle φ to a y-axis, and a distance ρ from the origin. The distance ρ is expressed by the following expression (10).

$$\rho = x \cos\theta \cos\phi + y \sin\theta \cos\phi + z \sin\phi \quad \text{[Expression 10]}$$

If there are several three-dimensional points on a plane having parameters $\theta_0$, $\phi_0$, $\rho_0$, then all of the planes that pass through each of the points can be expressed by one curved surface in a θ-φ-ρ space, and the curved surfaces cross each other at a point ($\theta_0$, $\phi_0$, $\rho_0$). Points are randomly selected from input data, and parameters are repeatedly calculated and voted to determine highly frequent parameters. The plane, which is expressed by the determined parameters, is regarded as being the flattest in the input data.

Figure 10A:
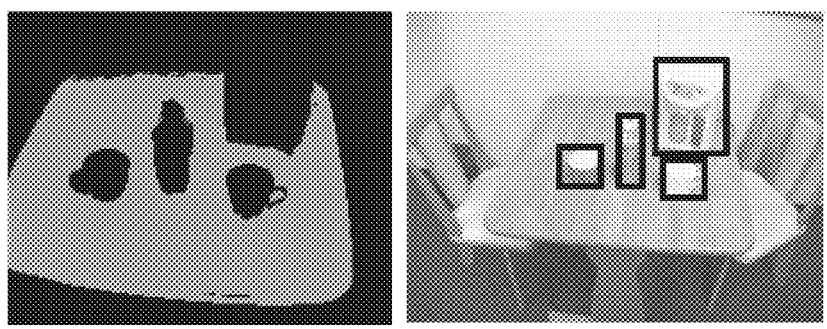
FIGS. 10A and 10B are views for explaining detection of an object by means of surface detection.
Figure 10B:
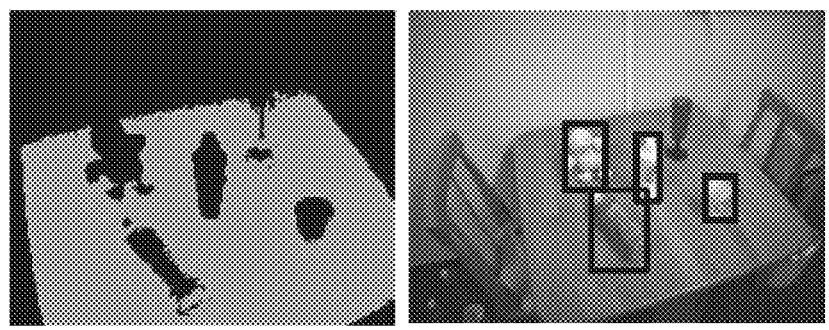

After a plane is obtained, all of the distance information is projected onto the plane and labeled to detect objects thereon. An example of the detection of an object based on plane detection is shown in FIGS. 10A and 10B. Since a plane such as a table or a floor does not have much texture in many cases, it has been customary for a stereo camera to fail to acquire the distance because parallax cannot be calculated. However, the proposed 3D sensors according to the present embodiment were able to detect the plane with high accuracy. Inasmuch as an object was detected based on distance information, as shown in FIG. 10B, the visual system according to the present embodiment failed to detect an object such as glass, the distance to which cannot be detected, as is the case with detection of an object based on motion attention. FIGS. 10A and 10B are views for explaining detection of an object by means of plane detection, in which FIG. 10A illustrates successful detection of an object by plane detection, and FIG. 10B illustrates failed detection of an object by plane detection.

B-2. Learning and Recognition of an Object

Color information, texture information, and three-dimensional shape information are used as clues to recognize an object. Such information is not always available, and needs to be selectively used depending on the nature of the object to be detected. For example, if an object has a sufficient amount of texture on the surface thereof, a matching process using PCA-SIFT is carried out to recognize the object. If an object has no texture on the surface thereof and fails to have sufficient SIFT features extracted therefrom, then shape information of the object is used to recognize the object. Color information is used as a histogram in order to narrow down object candidates because the stability thereof is low.

At the time of learning, the above information is stored as features of an object. At the time of recognizing, the stored information and the features of the object in an input image are compared with each other for matching. In an experiment, 50 objects were shown to and learned by the robot 16, as with the detection experiment, and then recognition experiments by the robot were made with respect to all of the objects. The objects were learned at one place in the living room. However, recognition experiments of the objects were conducted at four locations under different illuminating conditions, two times at each location, the locations including the location where the objects were learned. The results of such recognition experiments are shown in Table 2 below. The recognition rate was about 90% on average.

TABLE 2

| Object Recognition Rate | | | | |
| --- | --- | --- | --- | --- |
| | place 1 | place 2 | place 3 | place 4 |
| recognition rate (%) | 91 | 88 | 89 | 90 |

B-3. Generation of Three-Dimensional Environment Map

Figure 11A:
FIGS. 11A to 11C are views for explaining generation of a three-dimensional environmental map.
Figure 11B:
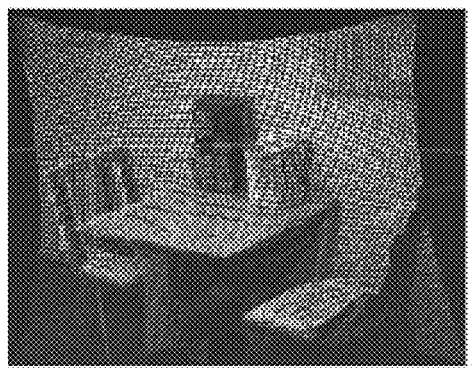
Figure 11C:

Using the data produced when the distance information and the color information are calibrated, a three-dimensional environment map is generated in an unknown environment. FIGS. 11A to 11C are views for explaining generation of a three-dimensional environmental map, in which FIG. 11A illustrates an image example in which color information is mapped onto distance information, FIG. 11B shows plotted coordinates of the image shown in FIG. 11A, and FIG. 11C shows a generated three-dimensional environmental map. As shown in FIGS. 11A and 11B, because the TOF camera 10 has a narrow angle of view and low resolution, in order to generate a wide-area map from information acquired by the TOF camera 10, the information of a plurality of scenes acquired by the TOF camera 10 have to be superposed. Although distance information of the scenes can be superposed by an ICP (Iterative Closest Point) algorithm, the distance information has to be roughly positioned initially. As such, initial positions are determined by matching SIFT feature points in each scene, using the color information mapped onto the distance information. A three-dimensional environment map thus generated is shown in FIG. 11C.

According to the present invention, 3D sensors provided by calibration of a TOF camera 10 and CCD cameras 12 are proposed, and a visual system incorporating such 3D sensors are mounted on a robot 16. The proposed 3D sensors are capable of acquiring more accurate information than a stereo camera, so that the acquired information can be used for various image processing applications. The robot 16 including the aforementioned visual system performed well in the @Home league of RoboCup, demonstrating the high capability thereof in terms of usefulness.

Figure 12:
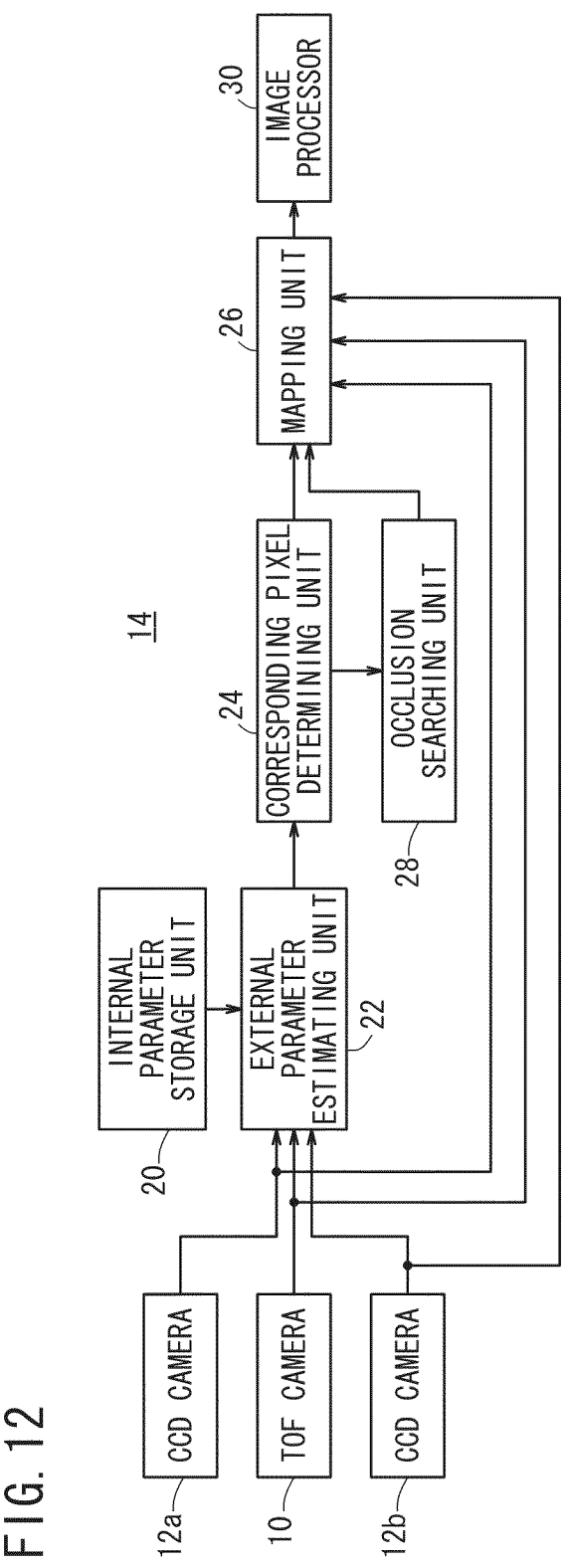
FIG. 12 is an outline electrical schematic view of an image capturing device according to an embodiment of the present invention.

FIG. 12 is an outline electrical schematic view of the image capturing device 14 according to the present embodiment. The image capturing device 14 is equipped with a TOF camera (distance image sensor) 10, two CCD cameras (luminance image sensors) 12 (one of the CCD cameras 12 will be referred to as a CCD camera 12a, whereas the other is referred to as a CCD camera 12b), an internal parameter storage unit 20, an external parameter estimating unit 22, a corresponding pixel determining unit 24, a mapping unit 26, an occlusion searching unit 28, and an image processor 30. A predetermined program is read into a computer, thus enabling the computer to function as the internal parameter storage unit 20, the external parameter estimating unit 22, the corresponding pixel determining unit 24, the mapping unit 26, the occlusion searching unit 28, and the image processor 30. Stated otherwise, by reading a predetermined program into the computer, which is equipped with the TOF camera 10 and the two CCD cameras 12, the computer is made to function as the image capturing device 14 of the present invention. The computer includes an unillustrated memory, with the aforementioned predetermined program being stored in the memory. Further, the memory may also function as the internal parameter storage unit 20.

The TOF camera 10 is a camera including an imaging element such as a CCD, CMOS or the like, and an irradiating device (not shown) that irradiates laser light, wherein based on TOF (time of flight) principles, the distance to a subject can be measured. When explained simply, by receiving reflected light from the laser light by the imaging element of the TOF camera 10, a time from irradiation of the subject with the laser light until entering of the reflected light on each of pixels of the image capturing element of the TOF camera 10 is measured. Consequently, the distance to the subject can be measured at each of the pixels. The distance image is a composite made up from distance information at each of the pixels.

The CCD cameras 12a, 12b include charge coupled devices (CCD) therein and acquire a luminance image of the subject. By including respective red (R), green (G) and blue (B) color filters, for example, the CCD cameras 12a, 12b can obtain a color image of the subject. According to the present embodiment, color information is included in the concept of luminance information. Such color information is made up, for example, from luminance information of respective R, G and B colors. The CCD cameras 12a, 12b may also be CMOS cameras, so long as such cameras include imaging elements therein that are capable of capturing two-dimensional images. The luminance image obtained by the CCD camera 12a will be referred to as a luminance image A, whereas the luminance image obtained by the CCD camera 12b will be referred to as a luminance image B. The luminance image is a composite made up from luminance information at each of the pixels.

The TOF camera 10 is disposed between the two CCD cameras 12a, 12b. The TOF camera 10 and the CCD cameras 12a, 12b also are disposed roughly horizontally with respect to the ground.

The internal parameter storage unit 20 stores internal parameters of the TOF camera 10 and the CCD cameras 12a, 12b. The internal parameters are parameters that serve to project a three-dimensional space onto a two-dimensional image plane, including such features as focal distance, a lens distortion coefficient, an optical center, pixel size and the like, and are parameters indicative of characteristics of the cameras themselves. The image capturing device 14 may include an internal parameter estimating unit for estimating the internal parameters of the TOF camera 10 and the CCD cameras 12a, 12b, such that the image capturing device 14 stores the internal parameters estimated by the internal parameter estimating unit. The internal parameter estimating unit estimates the internal parameters of the TOF camera 10 and the CCD cameras 12a, 12b using the distance image obtained from the TOF camera 10 and the luminance images obtained from the CCD cameras 12a, 12b. Techniques for estimating such internal parameters are well known and will not be described in detail, and the internal parameters can be estimated using a DLT method, the Tsai method, the Zhang method, or the like.

The external parameter is a parameter indicative of positions and attitudes, etc., in a three-dimensional space of the TOF camera 10 and the CCD cameras 12a, 12b, which can be estimated by the DLT method, the Tsai method, the Zhang method, or the like. The external parameter estimating unit 22 estimates the external parameters of the TOF camera 10 and the CCD cameras 12a, 12b using a distance image obtained from the TOF camera 10 and luminance images obtained from the CCD cameras 12a, 12b.

The corresponding pixel determining unit 24 determines a correspondence relationship between pixel positions in the distance image obtained by the TOF camera 10 and pixel positions in the luminance images A, B obtained by the CCD cameras 12a, 12b using the internal parameters and the external parameters. In other words, it is determined which pixel positions in the distance image correspond respectively to certain pixels of the luminance image A and the luminance image B.

Figure 2:
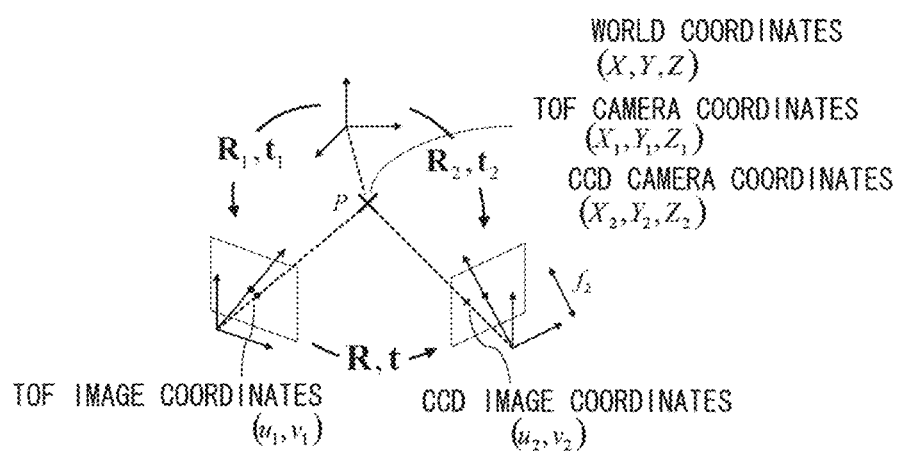
FIG. 2 is a diagram showing a positional relationship between the coordinate system of a TOF camera and the coordinate system of a CCD camera.

As described above, for example, in the case that the positional relationship shown in FIG. 2 exists between the TOF camera 10 and the CCD camera 12, then taking as a standard the coordinate system $(X_1, Y_1, Z_1)$ of the TOF camera 10, assuming that a parameter of rotation with respect to the coordinate systems $(X_2, Y_2, Z_2)$ of the CCD camera 12 is defined by R and a parameter of horizontal movement is defined by t, then concerning coordinates for a given point P, the above-noted relational expressions (2) through (4) are satisfied. In accordance with this relationship, three-dimensional information of all of the pixels acquired by the TOF camera 10 is converted into the coordinate system of the CCD camera 12. In addition, the three-dimensional information of all of the pixels of the TOF camera 10, which have been converted into the coordinate system of the CCD camera 12, are converted by the above expressions (5) and (6) into the image coordinate system of the CCD camera 12. In accordance with this principle, the correspondence relationship between pixel positions in the distance image and pixel positions in the luminance images A, B can be determined.

The mapping unit 26 associates (binds) the distance information of pixels in the distance image with luminance information of pixels in the luminance image that correspond to such pixels, using the correspondence relationship between pixel positions in the distance image and pixel positions in the luminance image, which have been determined by the corresponding pixel determining unit 24. In other words, luminance information of corresponding pixels is mapped to distance information in each of the pixels of an occlusion region of the distance image. As a result, the distance image and the luminance image can be integrated.

In greater detail, the mapping unit 26 maps luminance information of corresponding pixels of the luminance image A to distance information of pixels outside of the occlusion region with respect to the luminance image A, which were sought from within the distance image by the occlusion searching unit 28 to be described later. Further, from within the distance image, the mapping unit 26 maps luminance information of corresponding pixels of the luminance image B to distance information of pixels of the occlusion region with respect to the luminance image A.

The occlusion searching unit 28 searches for an occlusion region in the distance image, using the correspondence relationship between pixel positions in the distance image and pixel positions in the luminance image. In greater detail, the occlusion searching unit 28 searches within the distance image for an image region that is not captured by the CCD camera 12a (an occlusion region with respect to the luminance image A), and for an image region that is not captured by the CCD camera 12b (an occlusion region with respect to the luminance image B). Techniques employed for searching for such occlusion regions shall be explained in detail later.

As noted above, the image processor 30 carries out object detection processing, object learning and recognition processing, as well as processing for creating a three-dimensional environmental map, with respect to the distance image, in which luminance information has been integrated. The image processor 30 may also implement other image processing apart from those mentioned above with respect to the distance image having the luminance information integrated therein.

FIG. 13 is a view for explaining pixel positions $(u_i, v_j)$ in the luminance image. The variable $u_i$ indicates pixel positions in the row direction, while the variable $v_j$ indicates pixel positions in the column direction, where the subscript i is incremented as i=1, 2, 3, . . . , Nu, and the subscript j is incremented as j=1, 2, 3, . . . , Nv.

Within the luminance image, the first upper left pixel position is designated as $(u_1, v_1)$, and as the pixel position is moved to the right, the value of the subscript i of $u_i$, which indicates the position of the pixel position in the row direction, is incremented by 2, 3, 4, . . . Nu. Further, as the pixel position is moved downward, the value of the subscript j of $v_j$, which indicates the pixel position in the column direction, is incremented by 2, 3, 4, . . . Nv. The distance image forms information obtained by Nu×Nv individual pixels, and the imaging element of the TOF camera 10 includes Nu×Nv individual pixels therein.

Figure 14:
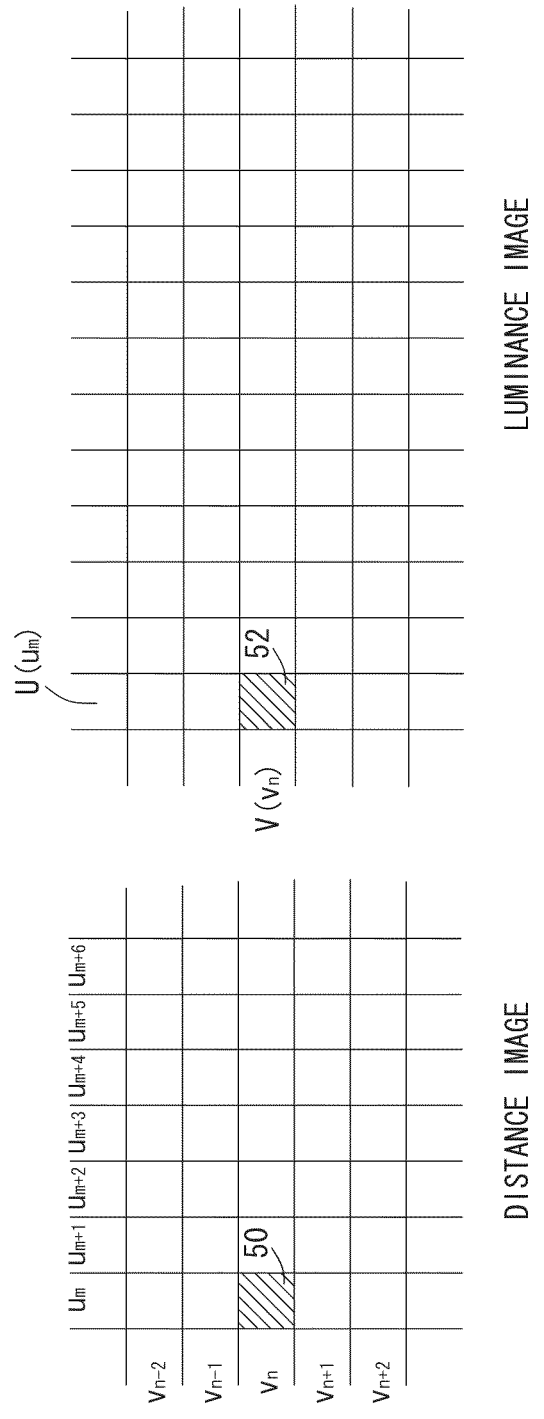
FIG. 14 is a view for explaining a technique of occlusion searching, in which the view shows a pixel position of a selected pixel in a distance image, in the case that i=m and j=n, as well as a pixel position of a pixel in a luminance image that corresponds to the selected pixel.
Figure 15:
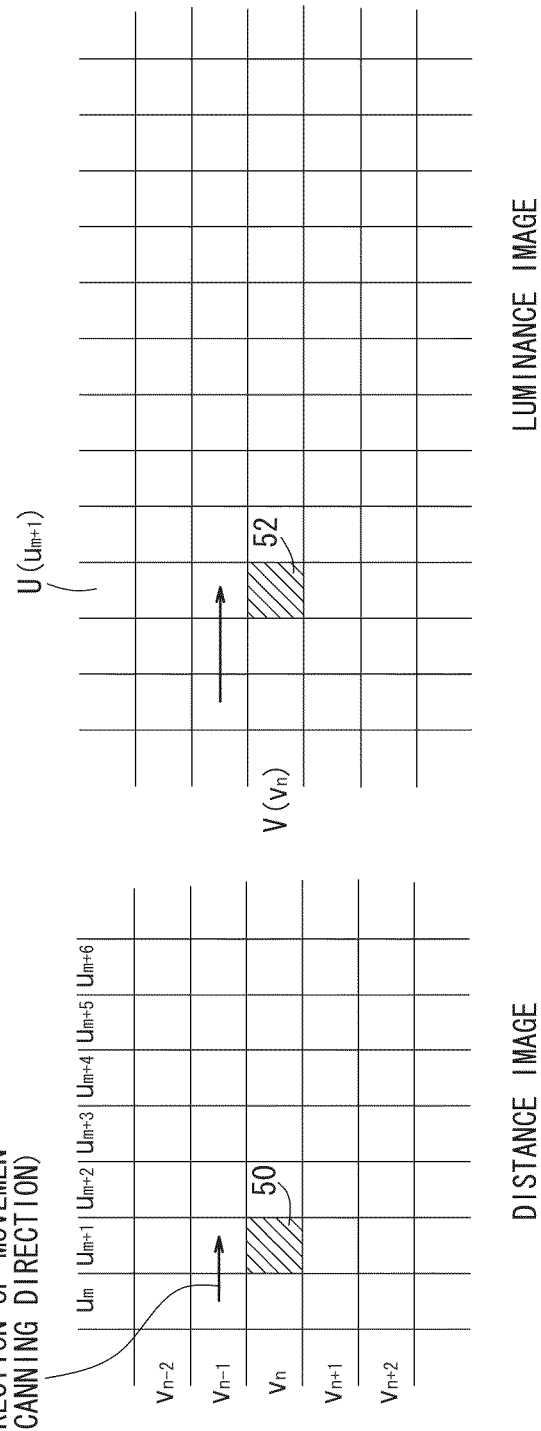
FIG. 15 is a view for explaining a technique of occlusion searching, in which the view shows a pixel position of a selected pixel in a distance image, in the case that i=m+1 and j=n, as well as a pixel position of a pixel in a luminance image that corresponds to the selected pixel.

Next, with reference to FIGS. 14 through 20, the method of searching for an occlusion region shall be explained. The pixel 50 shown in FIG. 14 represents one pixel that has been selected from within the distance image, the pixel position of the pixel 50 being designated by $(u_m, v_n)$ where (i=m, j=n), and wherein the pixel position of a pixel 52 in the luminance image that corresponds to the selected pixel 50 is designated by $(U(u_m), V(v_n))$. When the subscript i is incremented by 1 such that i becomes i+1 (i.e., the selected pixel 50 is shifted to the right by 1), as shown in FIG. 15, the pixel position of the newly selected pixel 50 becomes $(u_{m+1}, v_n)$, and the pixel position of the pixel 52, which corresponds to the pixel position $(u_{m+1}, v_n)$, becomes which $(U(u_{m+1}), V(v_n))$.

Figure 16:
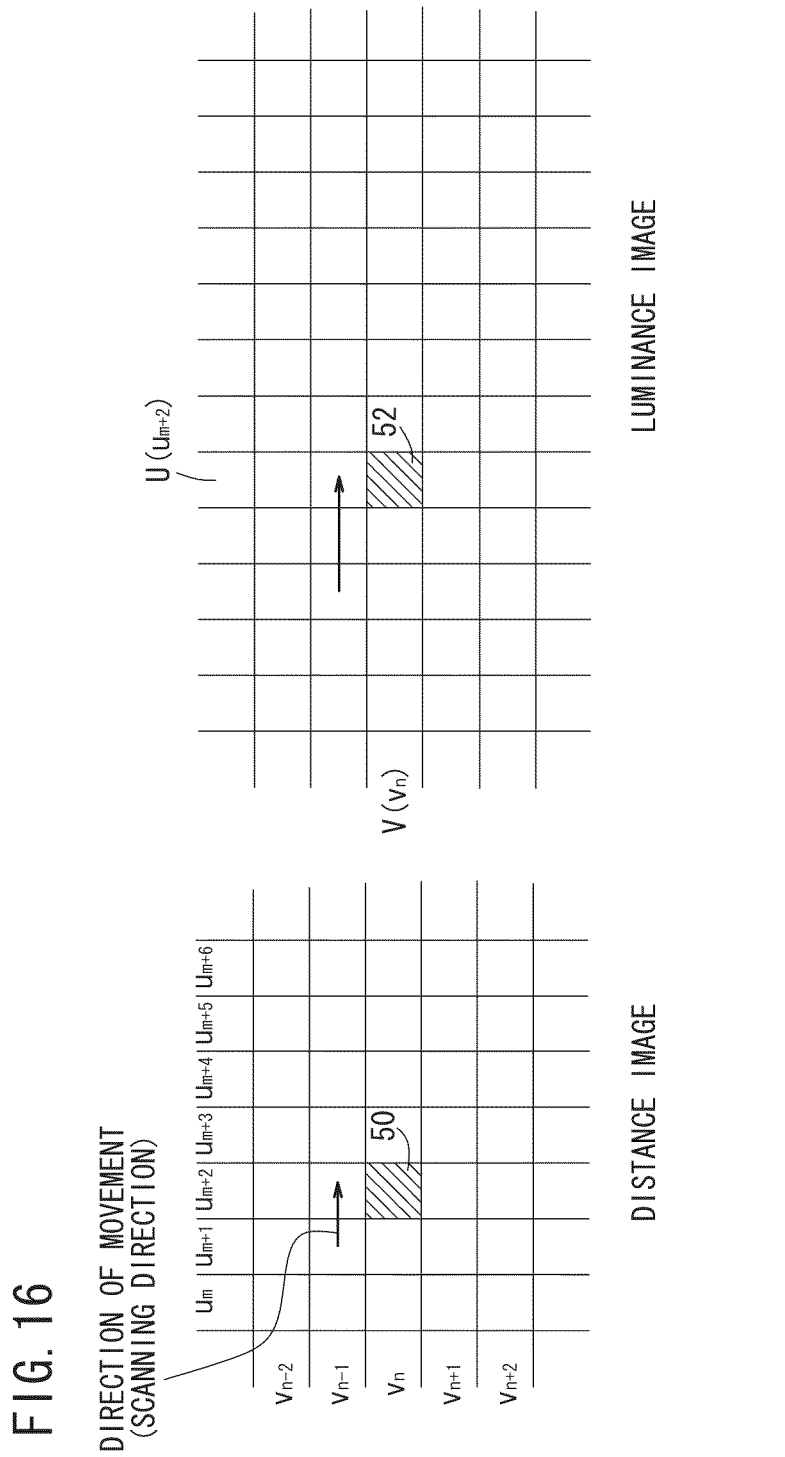
FIG. 16 is a view for explaining a technique of occlusion searching, in which the view shows a pixel position of a selected pixel in a distance image, in the case that i=m+2 and j=n, as well as a pixel position of a pixel in a luminance image that corresponds to the selected pixel.

Thereafter, when the subscript i is incremented by 1 again such that i becomes i+1, as shown in FIG. 16, the pixel position of the newly selected pixel 50 becomes $(u_{m+2}, v_n)$, and the pixel position of the pixel 52, which corresponds to the pixel position $(u_{m+2}, v_n)$, becomes $(U(u_{m+2}), V(v_n))$. Furthermore, when the subscript i is incremented by 1 again such that i becomes i+1, as shown in FIG. 17, the pixel position of the newly selected pixel 50 becomes $(u_{m+3}, v_n)$, and the pixel position of the pixel 52, which corresponds to the pixel position $(u_{m+3}, v_n)$, becomes $(U(u_{m+3}), V(v_n))$.

In this manner, as the pixel 50 of the distance image is scanned in one direction (i.e., as the selected pixel 50 is shifted successively to the right), the pixel 52 of the luminance image, which corresponds to the pixel 50 of the distance image, also moves in the same one direction. However, a pixel at the start of an occlusion region moves in a direction opposite to the direction of movement of the pixel 50 of the distance image. Making use of this behavior, the occlusion region is searched for.

Figure 17:
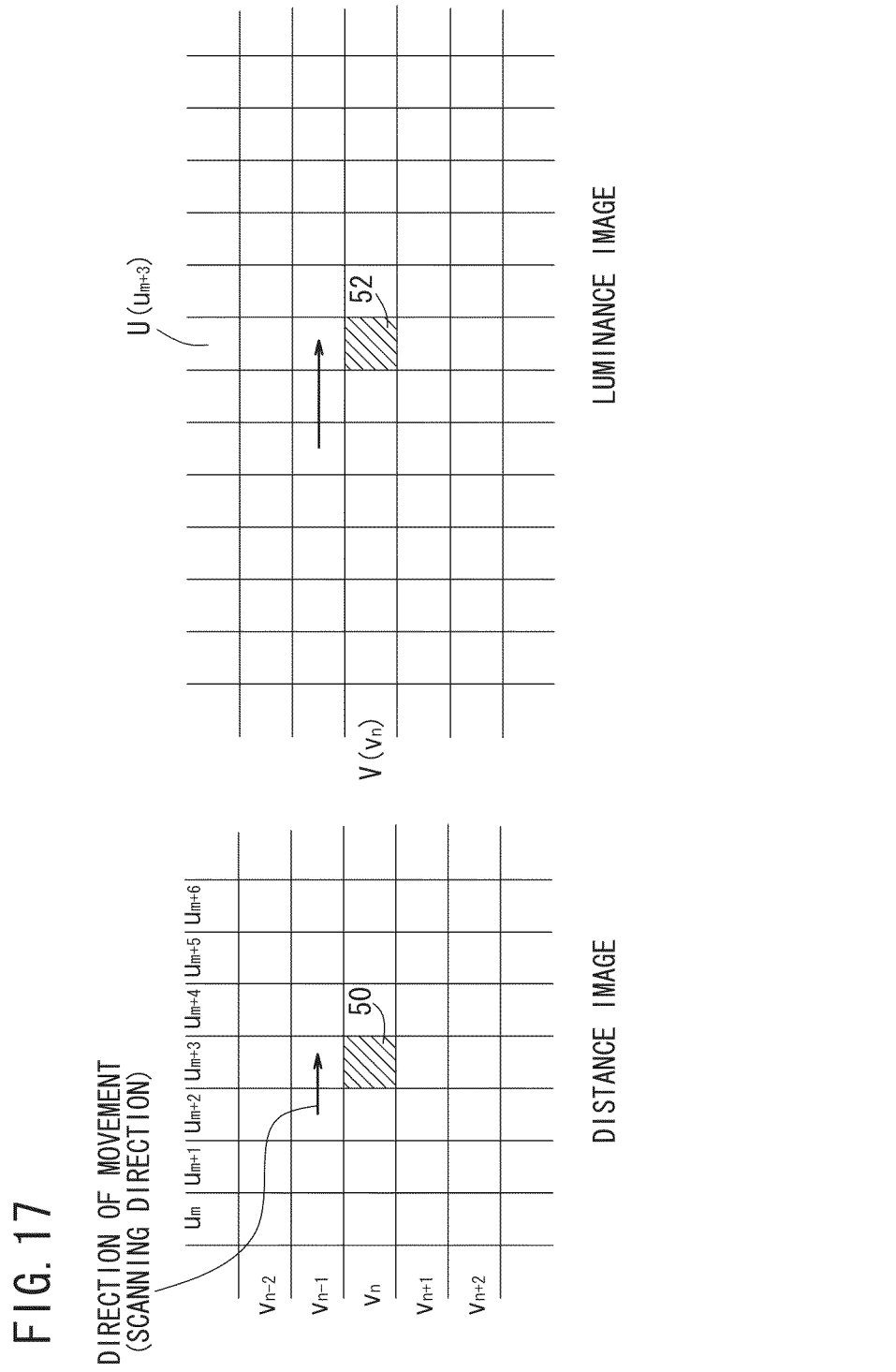
FIG. 17 is a view for explaining a technique of occlusion searching, in which the view shows a pixel position of a selected pixel in a distance image, in the case that i=m+3 and j=n, as well as a pixel position of a pixel in a luminance image that corresponds to the selected pixel.
Figure 18:
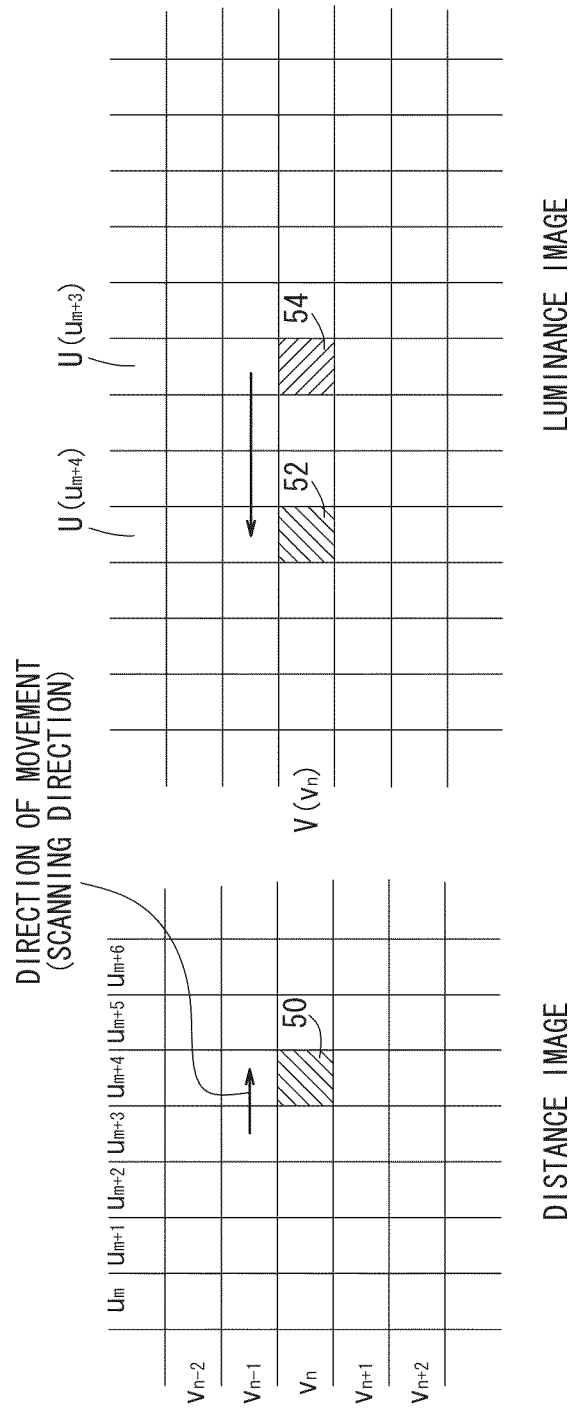
FIG. 18 is a view for explaining a technique of occlusion searching, in which the view shows a pixel position of a selected pixel in a distance image, in the case that i=m+4 and j=n, as well as a pixel position of a pixel in a luminance image that corresponds to the selected pixel.

At the condition shown by FIG. 17, when the subscript i is incremented by 1 again such that i becomes i+1, as shown in FIG. 18, the pixel position of the newly selected pixel 50 becomes $(u_{m+4}, v_n)$, and the pixel position of the pixel 52, which corresponds to the pixel position $(u_{m+4}, v_n)$, becomes $(U(u_{m+4}), V(v_n))$. However, as shown in FIG. 18, the pixel position $(U(u_{m+4}), V(v_n))$ is located on the left side of the previous pixel position $(U(u_{m+3}), V(v_n))$, whereby the movement direction thereof is reversed. Accordingly, the pixel 50 of the distance image, at a time when the movement direction of the pixel 52 of the luminance image becomes opposite to the movement direction of the pixel 50 of the distance image, is regarded as the pixel at the start of an occlusion of the column n. In other words, the pixel position $(u_{m+4}, v_n)$ is considered the pixel position at the start of an occlusion of the column n. The pixel of the luminance image, which is immediately prior to change of the movement direction of the pixel 52 of the luminance image, is designated by the reference numeral 54.

Figure 19:
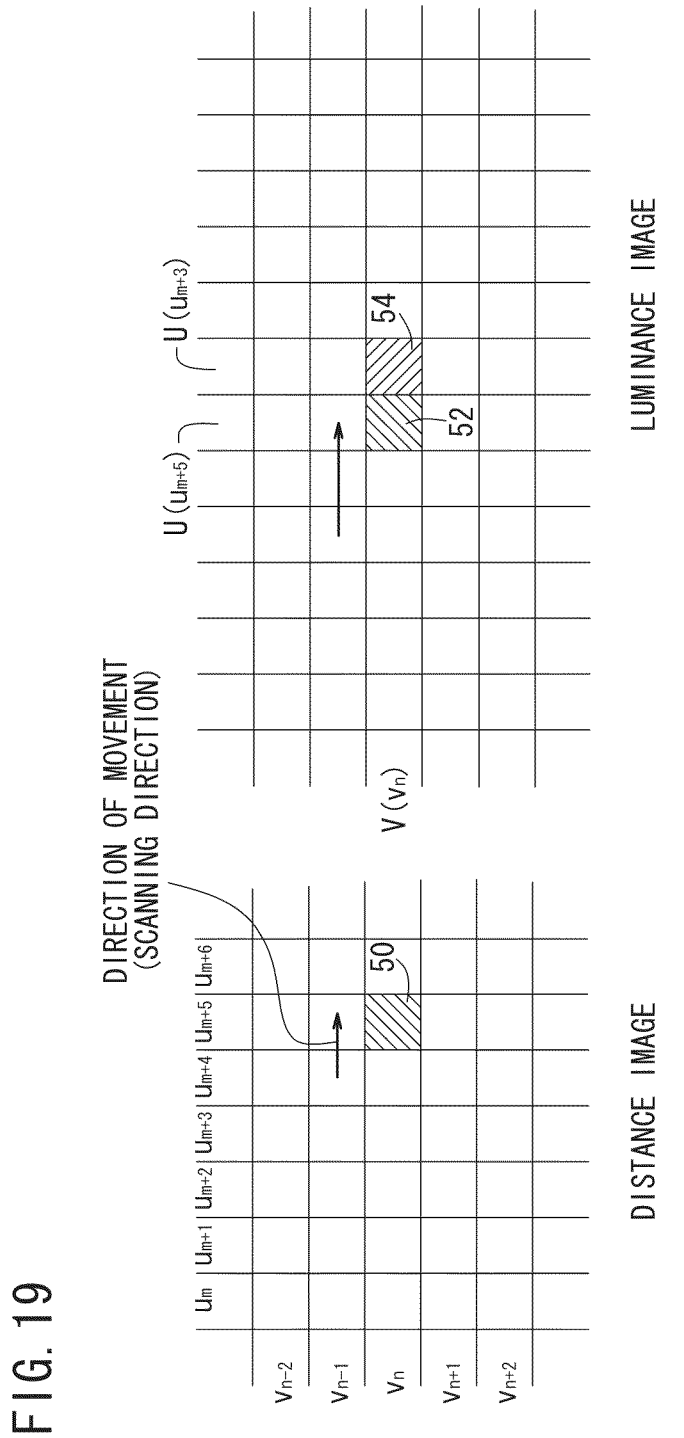
FIG. 19 is a view for explaining a technique of occlusion searching, in which the view shows a pixel position of a selected pixel in a distance image, in the case that i=m+5 and j=n, as well as a pixel position of a pixel in a luminance image that corresponds to the selected pixel.

Thereafter, when the subscript i is incremented by 1 again such that i becomes i+1, as shown in FIG. 19, the pixel position of the newly selected pixel 50 becomes $(u_{m+5}, v_n)$, and the pixel position of the pixel 52, which corresponds to the pixel position $(u_{m+5}, v_n)$, becomes $(U(u_{m+5}), V(v_n))$. Because the pixel position $(U(u_{m+5}), V(v_n))$ is located on the left side of the pixel position $(U(u_{m+3}), V(v_n))$ (i.e., on a side opposite to the movement direction), the pixel position $(u_{m+5}, v_n)$ is considered a pixel position of the occlusion region.

Figure 20:
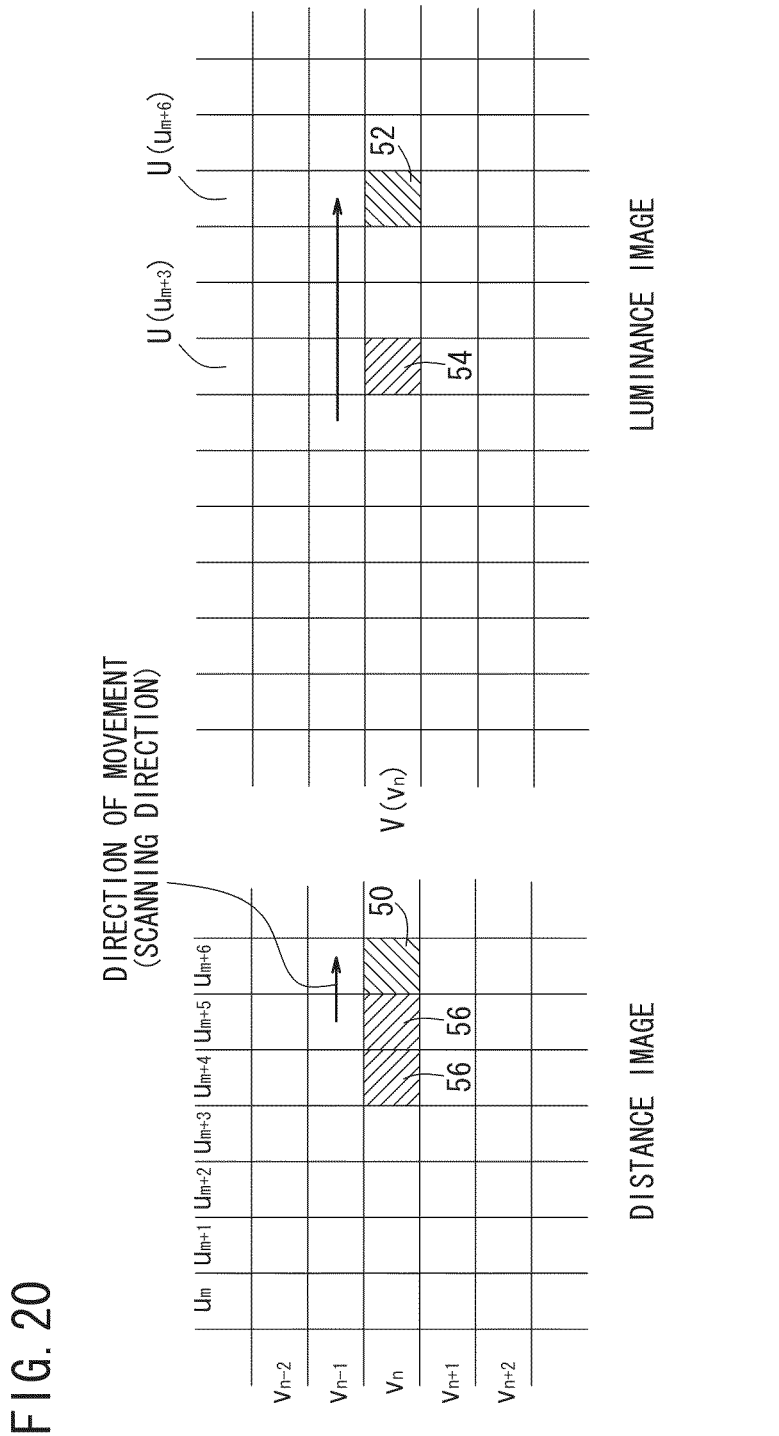
FIG. 20 is a view for explaining a technique of occlusion searching, in which the view shows a pixel position of a selected pixel in a distance image, in the case that i=m+6 and j=n, as well as a pixel position of a pixel in a luminance image that corresponds to the selected pixel.

At the condition shown by FIG. 19, when the subscript i is incremented by 1 again such that i becomes i+1, as shown in FIG. 20, the pixel position of the newly selected pixel 50 becomes $(u_{m+6}, v_n)$, and the pixel position of the pixel 52, which corresponds to the pixel position $(u_{m+6}, v_n)$, becomes $(U(u_{m+6}), V(v_n))$. Because the pixel position $(U(u_{m+6}), V(v_n))$ of the pixel 52 is located on the right side of the pixel position $(U(u_{m+3}), V(v_n))$ (i.e., on a side in the movement direction), the pixel position $(u_{m+6}, v_n)$ becomes a pixel position that is not within the occlusion region. Accordingly, the pixel position $(u_{m+5}, v_n)$ is considered a pixel position at which the occlusion region ends. In FIG. 20, pixels of the sought for occlusion region are designated by the reference numeral 56. In other words, the pixel position $(u_{m+5}, v_n)$ in the distance image, which is on the left side from the pixel position $(U(u_{m+3}), V(v_n))$ (i.e., on a side opposite to the movement direction) and which corresponds to the pixel position $(U(u_{m+5}), V(v_n))$ that is closest to the pixel position $(U(u_{m+3}), V(v_n))$ is considered to be a pixel position at the end of the occlusion region.

Next, operations of the image capturing device 14 of the present embodiment shall be explained with reference to the flowcharts of FIGS. 21 through 23.

Figure 21:
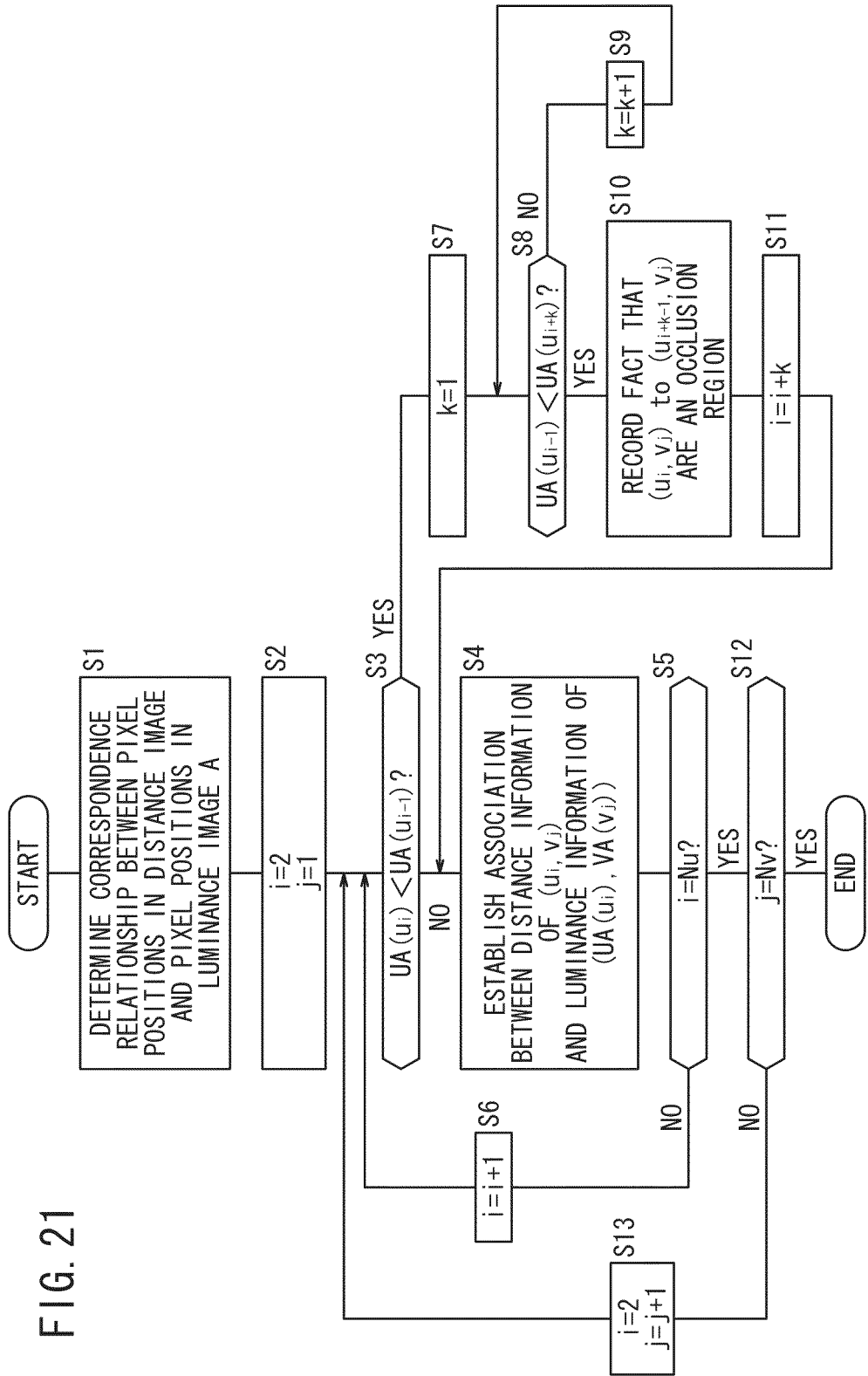
FIG. 21 is a flowchart showing operations of searching for a region (occlusion region) in a distance image, which is not captured by one CCD camera.

FIG. 21 is a flowchart showing operations of searching, within the distance image, for a region (an occlusion region with respect to the luminance image A), which is not captured by the CCD camera 12a. FIG. 22 is a flowchart showing operations of searching, within the distance image, for a region (an occlusion region with respect to the luminance image B), which is not captured by the CCD camera 12b. FIG. 23 is a flowchart showing operations for compensating luminance information of the occlusion region sought by the operations shown in FIG. 21 by the luminance image B, which is obtained by the CCD camera 12b. Pixel positions in the distance image are represented by $(u_i, v_j)$, and pixel positions in the luminance image A and the luminance image B, which correspond to the pixel position $(u_i, v_j)$, are represented respectively by $(UA(u_i), VA(v_j))$ and $(UB(u_i), VB(v_j))$. $U_i$, $UA(u_i)$, $UB(u_i)$ indicate pixel positions in the row direction, whereas $v_j$, $UA(v_j)$, $UB(v_j)$ indicate pixel positions in the column direction. Further, concerning values of the pixel positions $u_i$, $UA(u_i)$, $UB(u_i)$ in the row direction, the values of pixel positions that are more to the right side are greater.

First, with reference to the flowchart of FIG. 21, explanations shall be made concerning operations of searching for an occlusion with respect to the luminance image A. In step S1, the corresponding pixel determining unit 24 determines a correspondence relationship between each of pixel positions in the distance image and each of pixel positions in the luminance image A.

Next, in step S2, the occlusion searching unit 28 sets the subscripts i and j to i=2 and j=1. In accordance therewith, the pixel at pixel position $(u_2, v_1)$ in the luminance image A is selected.

Next, in step S3, the occlusion searching unit 28 determines whether or not the pixel position $UA(u_i)$ in the row direction is less than the pixel position $UA(u_{i-1})$ in the row direction (i.e., whether or not the relational expression $UA(u_i)<UA(u_{i-1})$ is satisfied). Stated otherwise, it is determined whether or not the pixel position $(UA(u_i), VA(v_j))$ of the pixel in the luminance image A, which corresponds to the pixel position $(u_i, v_j)$ of the currently selected pixel in the distance image, is more to the left side (the side opposite to the side of the scanning direction) than the pixel position $(UA(u_{i-1}), VA(v_j))$ of the pixel in the luminance image A that corresponds to the pixel position $(u_{i-1}, v_j)$ of the previously selected pixel in the distance image. The scanning direction in the flowchart of FIG. 21 is defined as the direction of movement of the pixel position $(u_i, v_j)$ of the selected pixel, for a case in which the value of i becomes larger. In other words, in this case, the scanning direction is a rightward direction, as can be interpreted from FIG. 13.

Consequently, it can be determined whether or not the currently selected pixel position $(u_i, v_j)$ of the distance image is a pixel position at the start of an occlusion region. More specifically, in the case that the pixel position $UA(u_i)$ in the row direction is smaller than $UA(u_{i-1})$, it is determined that the movement direction of the pixel positions $(UA(u_i), VA(v_j))$ being selected has changed, and it is determined that the currently selected pixel position $(u_i, v_j)$ is a pixel position at the start of an occlusion region.

If it is judged in step S3 that the pixel position $UA(u_i)$ in the row direction is not smaller than the pixel position $UA(u_{i-1})$, then in step S4, the occlusion searching unit 28 makes an association in the mapping unit 26 between the distance information of the pixel position $(u_1, v_j)$ of the currently selected pixel and the luminance information of the pixel position $(UA(u_i), VA(v_j))$ in the luminance image A that corresponds to that pixel. Stated otherwise, the mapping unit 26 maps luminance information of the pixel position $(UA(u_i), VA(v_j))$ to distance information of the currently selected pixel position $(u_i, v_j)$.

Next, in step S5, the occlusion searching unit 28 determines whether or not the value of the currently set subscript i is the same as the value of Nu. In other words, it is determined whether or not the currently set subscript satisfies the relational expression i=Nu. If it is judged in step S5 that the relational expression i=Nu is not satisfied, then the routine proceeds to step S6, whereupon the occlusion searching unit 28 increments the subscript i such that i=i+1, and then returns to step S3. As a result, the selected pixel in the distance image can be moved by one step in the scanning direction.

On the other hand, if it is judged in step S3 that the pixel position $UA(u_i)$ in the row direction is smaller than the pixel position $UA(u_{i-1})$, then in step S7, the occlusion searching unit 28 determines that the currently selected pixel position $(u_i, v_j)$ is a pixel position at the start of an occlusion region, and sets the subscript k such that k=1. The pixel position at the start of the occlusion region, as determined in step S3, corresponds to the pixel position $(u_{m+4}, v_n)$ of the pixel 50 shown in FIG. 18.

Next, in step S8, the occlusion searching unit 28 determines whether or not the pixel position $UA(u_{i-1})$ in the row direction is less than the pixel position $UA(u_{i+k})$ in the row direction (i.e., whether or not the relational expression $UA(u_{i-1})<UA(u_{i+k})$ is satisfied). Stated otherwise, it is determined whether or not the pixel position $(UA(u_{i+k}), VA(v_j))$ of the pixel in the luminance image A, which corresponds to the pixel position $(u_{i+k}, v_j)$ of the pixel in the distance image, is more to the right side (the side of the scanning direction) than the pixel position $(UA(u_{i-1}), VA(v_j))$ of the pixel in the luminance image A immediately before change in the direction of movement. The pixel position $(UA(u_{i-1}), VA(v_j))$ of the pixel in the luminance image A immediately before change in the direction of movement corresponds to the pixel position $(U(u_{m+3}), V(v_n))$ of the pixel 54 shown by FIGS. 18 through 20. Consequently, it can be judged whether or not the occlusion region has ended.

If it is judged in step S8 that the pixel position $UA(u_{i-1})$ in the row direction is not less than the pixel position $UA(u_{i+k})$, then the routine proceeds to step S9, whereupon the occlusion searching unit 28 increments the subscript k such that k=k+1, and then returns to step S8.

On the other hand, if it is judged in step S8 that the pixel position $UA(u_{i-1})$ in the row direction is less than the pixel position $UA(u_{i+k})$, then in step S10, the occlusion searching unit 28 determines that the pixel position $(u_{i+k-1}, v_j)$ is a pixel position at which the occlusion region ends, and stores in the memory the pixel positions $(u_i, v_j)$ to $(u_{i+k-1}, v_j)$ of the occlusion region with respect to the luminance image A. For example, in the case that the presently set value of the subscript k is 2, the pixel position $(u_i, v_j)$ and the pixel position $(u_{i+1}, v_j)$ make up the occlusion region.

The pixel position $(u_i, v_j)$ at step S8 through step S10 is a pixel position at which the start of the occlusion region was judged in step S3, and also is the presently selected pixel position. Further, the pixel position $(u_{i+k-1}, v_j)$ corresponds to the pixel position $(u_{m+5}, v_n)$ of the pixel 50 shown by FIG. 19. Stated otherwise, the pixel position $(u_{i+k-1}, v_j)$ is a pixel position in the distance image that corresponds to the pixel position $(UA(u_{i+k-1}), VA(v_j))$ in the luminance image A immediately before becoming on the side of the scanning direction from the pixel position $(UA(u_{i-1}), VA(v_j))$ (corresponding to the pixel position $(U(u_{m+3}), V(v_n))$ of the pixel 54 shown in FIGS. 18 to 20), just before the movement direction of the pixel position of the pixel in the luminance image A changes. The pixel position $(UA(u_{i+k-1}), VA(v_j))$ corresponds to the pixel position $(U(u_{m+5}), V(v_n))$ of the pixel 52 shown in FIG. 19.

Next, in step S11, the occlusion searching unit 28 increments the subscript i such that i=i+k, and then the routine returns to step S4. As a result, the pixel at pixel position $(u_i, v_j)$ is newly selected, and in step S4, an association is established between the distance information of the newly selected pixel position $(u_i, v_j)$ and the luminance information of the pixel position $(UA(u_i), VA(v_j))$ in the luminance image A corresponding to the newly selected pixel $(u_i, v_j)$.

If it is judged in step S5 that the relational expression i=Nu is satisfied, the occlusion searching unit 28 determines in step S12 whether or not the presently set value j and the value or Nv are the same. In other words, it is determined whether of not the presently set value of j satisfies the relational expression j=Nv. If it is determined in step S12 that the relational expression j=Nv is not satisfied, then in step S13, the occlusion searching unit 28 sets the subscripts i and j such that i=2 and j=j+1, and the routine returns to step S3. As a result, the occlusion region can be sought in each of successive columns. On the other hand, if it is determined in step S12 that the relational expression j=Nv is satisfied, then the occlusion searching process is brought to an end.

In this manner, within the distance image, because luminance information is not mapped to distance information of pixel positions $(u_i, v_i)$ of the occlusion region with respect to the luminance image A, the occlusion can be eliminated.

Figure 22:
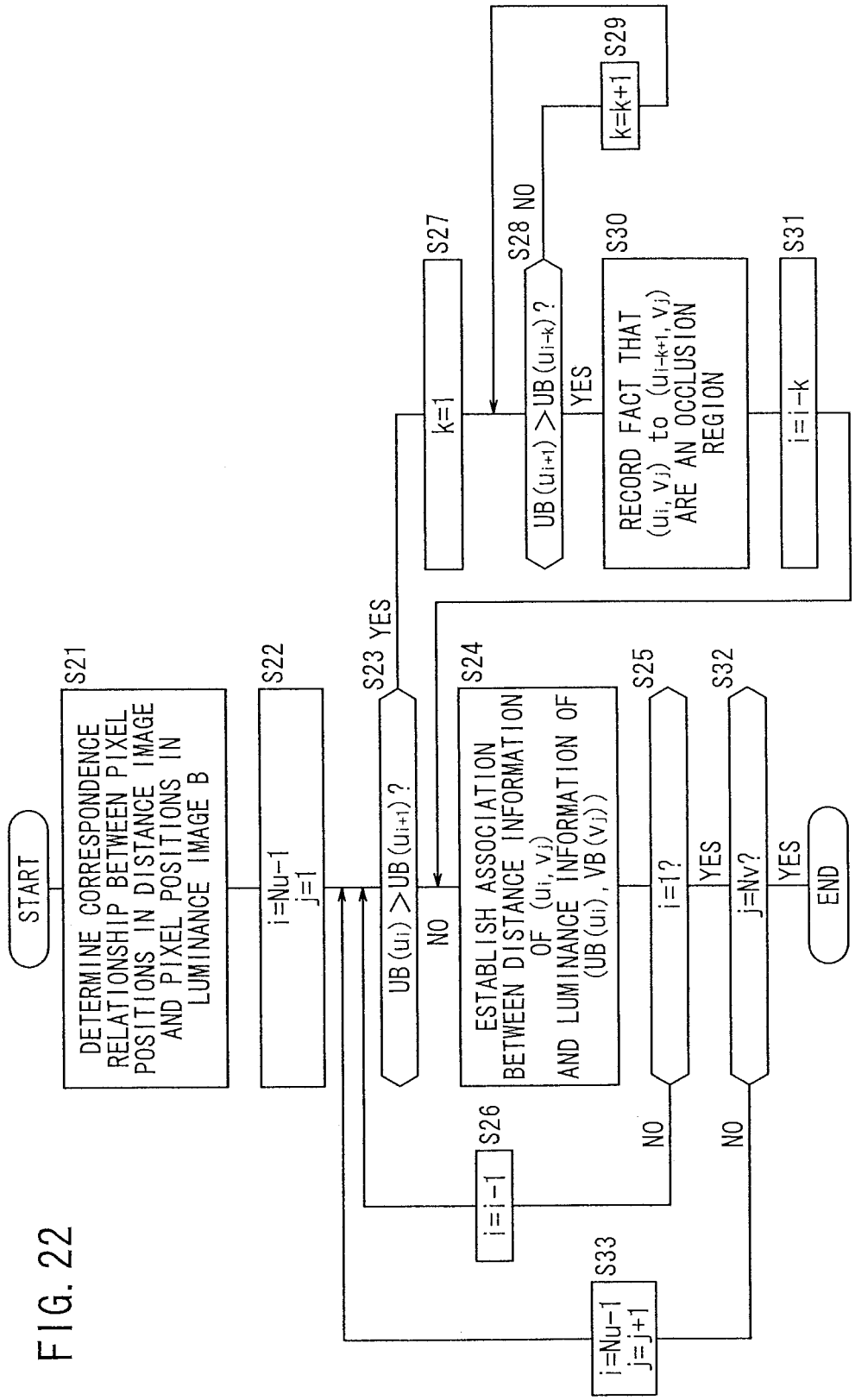
FIG. 22 is a flowchart showing operations of searching for a region (occlusion region) in a distance image, which is not captured by another CCD camera.

Next, with reference to the flowchart of FIG. 22, an explanation shall be made concerning operations of searching for an occlusion with respect to the luminance image B. In step S21, the corresponding pixel determining unit 24 determines a correspondence relationship between each of pixel positions in the distance image and each of pixel positions in the luminance image B.

Next, in step S22, the occlusion searching unit 28 sets the subscripts i and j to i=Nu−1 and j=1. In accordance therewith, the pixel at pixel position $(u_{Nu-1}, v_1)$ in the luminance image B is selected.

Next, in step S23, the occlusion searching unit 28 determines whether or not the pixel position $UB(u_i)$ in the row direction is more than the pixel position $UB(u_{i+1})$ in the row direction (i.e., whether or not the relational expression $UB(u_i) > UB(u_{i+1})$ is satisfied). Stated otherwise, it is determined whether or not the pixel position $(UB(u_i), VB(v_j))$ of the pixel in the luminance image B, which corresponds to the pixel position $(u_i, v_j)$ of the currently selected pixel in the distance image, is more to the right side (the side opposite to the side of the scanning direction) than the pixel position $(UB(u_{i+1}), VB(v_j))$ of the pixel in the luminance image B that corresponds to the pixel position $(u_{i+1}, v_j)$ of the previously selected pixel in the distance image. The scanning direction in the flowchart of FIG. 22 is defined as the direction of movement of the pixel position $(u_i, v_j)$ of the selected pixel, for a case in which the value of i becomes smaller. In other words, in this case, the scanning direction is a leftward direction, as can be interpreted from FIG. 13.

Consequently, it can be determined whether or not the currently selected pixel position $(u_i, v_j)$ of the distance image is a pixel position at the start of an occlusion region. More specifically, in the case that the pixel position $UB(u_i)$ in the row direction is greater than $UB(u_{i+1})$, it is determined that the movement direction of the pixel positions $(UB(u_i), VB(v_j))$ being selected has changed, and it is determined that the currently selected pixel position $(u_i, v_j)$ is a pixel position at the start of an occlusion region.

If it is judged in step S23 that the pixel position $UB(u_i)$ in the row direction is not greater than the pixel position $UB(u_{i+1})$, then in step S24, the occlusion searching unit 28 makes an association in the mapping unit 26 between the distance information of the pixel position $(U_i, v_j)$ of the currently selected pixel and the luminance information of the pixel position $(UB(u_i), VB(v_j))$ in the luminance image B that corresponds to that pixel. Stated otherwise, the mapping unit 26 maps luminance information of the pixel position $(UB(u_i), VB(v_j))$ to distance information of the currently selected pixel position $(u_i, v_j)$.

Next, in step S25, the occlusion searching unit 28 determines whether or not the value of the currently set subscript i is equal to 1. In other words, it is determined whether or not the currently set subscript i satisfies the relational expression i=1. If it is judged in step S25 that the relational expression i=1 is not satisfied, then the routine proceeds to step S26, whereupon the occlusion searching unit 28 decrements the subscript i such that i=i−1, and then returns to step S23. As a result, the selected pixel in the distance image can be moved by one step in the scanning direction.

On the other hand, if it is judged in step S23 that the pixel position $UB(u_i)$ in the row direction is greater than the pixel position $UB(u_{i+1})$, then in step S27, the occlusion searching unit 28 determines that the currently selected pixel position $(u_i, v_j)$ is a pixel position at the start of an occlusion region, and sets the subscript k such that k=1.

Next, in step S28, the occlusion searching unit 28 determines whether or not the pixel position $UB(u_{i+1})$ in the row direction is greater than the pixel position $UB(u_{i-k})$ in the row direction (i.e., whether or not the relational expression $UB(u_{i+1}) > UB(u_{i-k})$ is satisfied). Stated otherwise, it is determined whether or not the pixel position $(UB(u_{i+k}), VB(v_j))$ of the pixel in the luminance image B, which corresponds to the pixel position $(u_{i-k}, v_j)$ of the pixel in the distance image, is more to the left side (the side of the scanning direction) than the pixel position $(UB(u_{i+1}), VB(v_j))$ of the pixel in the luminance image B immediately before change in the direction of movement. Consequently, it can be judged that the occlusion region has ended.

If it is judged in step S28 that the pixel position $UB(u_{i+1})$ in the row direction is not greater than the pixel position $UB(u_{i-k})$, then the routine proceeds to step S29, whereupon the occlusion searching unit 28 increments the subscript k such that k=k+1, and then returns to step S28.

On the other hand, if it is judged in step S28 that the pixel position $UB(u_{i+1})$ in the row direction is greater than the pixel position $UB(u_{i-k})$, then in step S30, the occlusion searching unit 28 determines that the pixel position $(u_{i-k+1}, v_j)$ is a pixel position at which the occlusion region ends, and stores in the memory the pixel positions $(u_i, v_j)$ to $(u_{i-k+1}, v_j)$ of the occlusion region with respect to the luminance image B. For example, in the case that the presently set value of the subscript k is 2, the pixel position $(u_i, v_j)$ and the pixel position $(u_{i-1}, v_j)$ make up the occlusion region.

The pixel position $(u_i, v_j)$ at step S28 through step S30 is a pixel position at which the start of the occlusion region was judged in step S23, and also is the presently selected pixel position.

Next, in step S31, the occlusion searching unit 28 decrements the subscript i such that i=i−k, and then the routine returns to step S24. As a result, the pixel at pixel position $(u_i, v_j)$ is newly selected, and in step S24, an association is established between the distance information of the newly selected pixel position $(u_i, v_j)$ and the luminance information of the pixel position $(UB(u_i), VB(v_j))$ in the luminance image B corresponding to the newly selected pixel $(u_i, v_j)$.

If it is judged in step S25 that the relational expression i=1 is satisfied, the occlusion searching unit 28 determines in step S32 whether or not the presently set value j and the value of Nv are the same. In other words, it is determined whether or not the presently set value of j satisfies the relational expression j=Nv. If it is determined in step S32 that the relational expression j=Nv is not satisfied, then in step S33, the occlusion searching unit 28 sets the subscripts i and j such that i=Nu−1 and j=j+1, and the routine returns to step S23. As a result, the occlusion region can be searched for in each of successive columns. On the other hand, if it is determined in step S32 that the relational expression j=Nv is satisfied, then the occlusion searching process is brought to an end.

In this manner, within the distance image, because luminance information is not mapped to distance information of pixel positions $(u_i, v_i)$ of the occlusion region with respect to the luminance image B, the occlusion can be eliminated.

Moreover, although in the foregoing descriptions, the scanning direction used when searching for the occlusion region with respect to the luminance image B was opposite to the scanning direction used when searching for the occlusion region with respect to the luminance image A, the scanning direction may be the same for both. In such a case, operations for searching for the occlusion region with respect to the luminance image B are handled similarly to the flowchart shown in FIG. 21.

Figure 23:
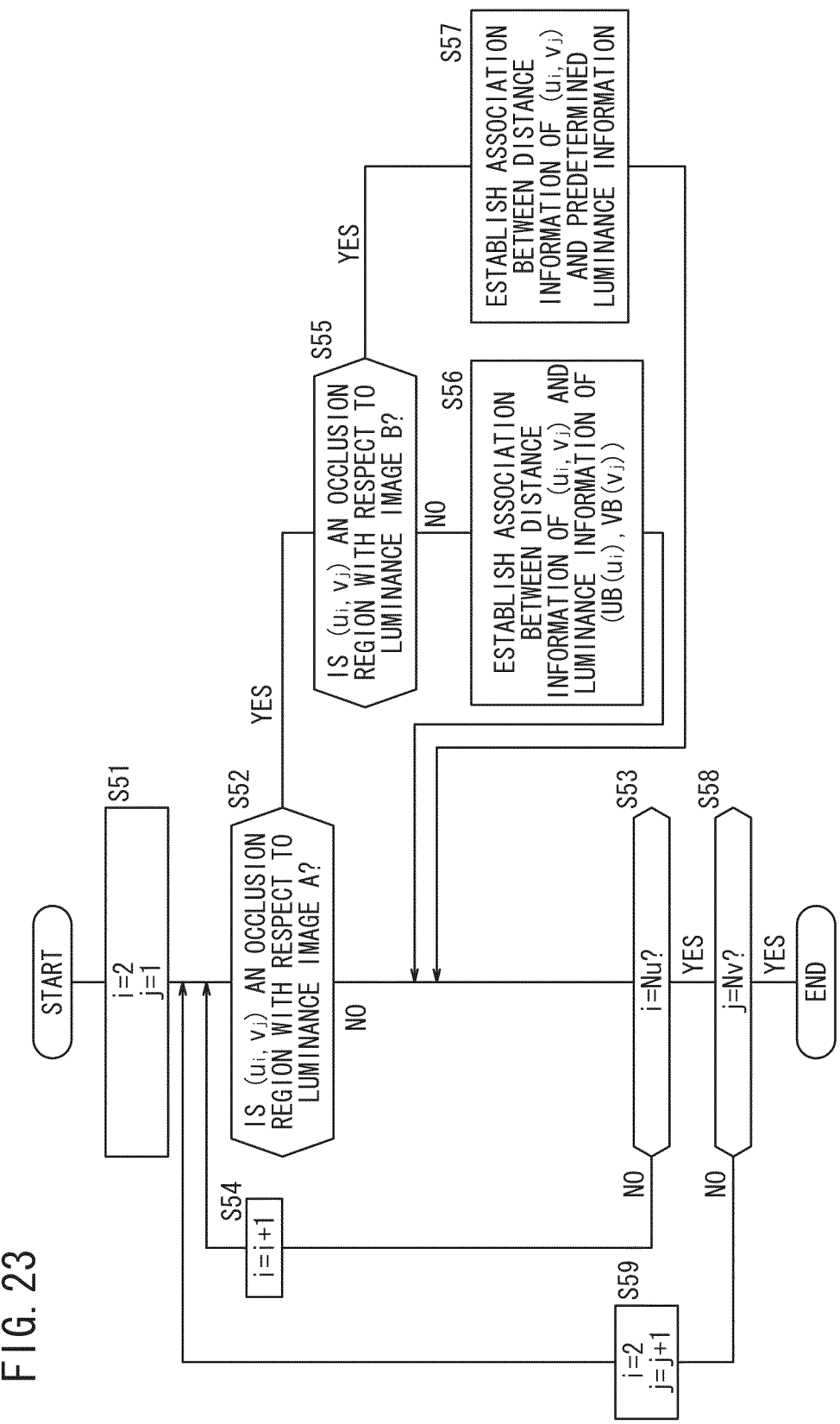
FIG. 23 is a flowchart showing operations for compensating for luminance information of the occlusion region sought by the operations shown in FIG. 21 by a luminance image B, which is obtained by another CCD camera.

Next, with reference to the flowchart of FIG. 23, operations for compensating the luminance information of the occlusion region shall be explained. In step S51, the mapping unit 26 sets the subscripts i and j such that i=2 and j=1. As a result, a pixel at the pixel position $(u_2, v_1)$ is selected.

Next, in step S52, the mapping unit 26 determines whether or not the selected pixel position $(u_i, v_i)$ is an occlusion region with respect to the luminance image A. Such a determination is made based on whether or not the selected pixel position was stored in the memory in step S10 as an occlusion region with respect to the luminance image A.

If it is determined in step S52 that the currently selected pixel position $(u_i, v_i)$ is not an occlusion region with respect to the luminance image A, then in step S53, the mapping unit 26 determines whether or not the presently set value of i is the same as the value Nu. In other words, it is judged whether or not the presently set value of i satisfies the relational expression i=Nu. If it is determined in step S53 that the relational expression i=Nu is not satisfied, the routine proceeds to step S54, whereupon the mapping unit 26 increments the subscript i such that i=i+1, and then returns to step S52.

On the other hand, if it is determined in step S52 that the currently selected pixel position $(u_i, v_i)$ is an occlusion region with respect to the luminance image A, then in step S55, the mapping unit 26 determines whether or not the currently selected pixel position $(u_i, v_i)$ is an occlusion region with respect to the luminance image B. Such a determination is made based on whether or not the selected pixel position $(u_i, v_j)$ is stored in the memory as an occlusion region with respect to the luminance image B.

If it is determined in step S55 that the currently selected pixel position $(u_i, v_j)$ is not an occlusion region with respect to the luminance image B, then in step S56, the mapping unit 26 establishes an association between the distance information of the pixel position $(u_i, v_j)$ and the luminance information of the pixel position $(UB(u_i), UB(v_j))$ in the luminance image B that corresponds to the pixel position $(u_i, v_j)$, and then returns to step S53. In other words, the luminance information of the pixel position $(UB(u_i), UB(v_j))$ is mapped to the distance information of the currently selected pixel position $(u_i, v_j)$. In this manner, since from within the distance image, luminance information of the luminance image B is mapped to distance information of the pixel position $(u_i, v_j)$ of the occlusion region with respect to the luminance image A, the occlusion can be eliminated. Together therewith, a distance image can be obtained in which correct color information is mapped onto the occlusion region, so that a clean three-dimensional image can be obtained.

On the other hand, if it is determined in step S55 that the currently selected pixel position $(u_i, v_j)$ is an occlusion region with respect to the luminance image B, then in step S57, the mapping unit 26 establishes an association between the distance information of the currently selected pixel position $(u_i, v_j)$ and predetermined luminance information (e.g., predetermined luminance information defined by black, white, etc.), and then returns to step S53. In other words, predetermined luminance information is mapped to the distance information of the currently selected pixel position $(u_i, v_j)$. As a result, the occlusion can be eliminated.

If it is judged in step S53 that the relational expression i=Nu is satisfied, then in step S58, the mapping unit 26 determines whether or not the currently set value of the subscript j is the same as the value of Nv. In other words, it is determined whether or not the currently set value of j satisfies the relational expression j=Nv. If it is determined in step S58 that the relational expression j=Nv is not satisfied, the routine proceeds to step S59, whereupon the mapping unit 26 sets the subscripts i and j such that i=2 and j=j+1, and then returns to step S52. If it is determined in step S58 that the relational expression j=Nv is satisfied, then operations to compensate the luminance information of the occlusion region are brought to an end.

In the occlusion searching operation shown in FIG. 21, together with searching for the occlusion region, luminance information is mapped to pixel positions $(u_i, v_j)$ that are not part of the occlusion region. However, irrespective of whether there is an occlusion region or not, luminance information of pixel positions $(UA(u_i), UA(v_j))$ in the luminance image A that correspond respectively to each of such pixels may be mapped to distance information of pixel positions $(u_i, v_j)$ of each of pixels in the distance image. In this case, after mapping of the luminance information, searching of the occlusion region of the distance image with respect to the luminance image A is carried out. In the case that the result of such searching indicates the existence of an occlusion region, tying together of the distance information of the pixel positions $(u_i, v_j)$ of the sought occlusion region and the luminance information of the pixel positions $(UA(u_i), UA(v_j))$ in the luminance image A that correspond to the pixel positions is canceled (the mapping therebetween is released), and luminance information of pixel positions $(UB(u_i), UB(v_j))$ in the luminance image B that correspond to such pixel positions are mapped together with distance information of the pixel positions $(u_i, v_j)$ of the occlusion region. In this case, in the event that a region exists where the occlusion region with respect to the luminance image A and the occlusion region with respect to the luminance image B overlap each other, predetermined luminance information is mapped to pixels $(u_i, v_j)$ of the overlapping region.

In this manner, according to the present embodiment, a correspondence relationship is determined between a pixel position $(u_i, v_j)$ in the distance image and a pixel position $(UA(u_i), UA(v_j))$ in the luminance image A, and using the determined correspondence relationship between the pixel position $(u_i, v_j)$ in the distance image and the pixel position $(UA(u_i), UA(v_j))$ in the luminance image A, an occlusion region in the distance image is searched for. Therefore, the occlusion region can be searched for and discovered.

Further, because upon searching for the occlusion region, pixels in the distance image are scanned in one direction, and a pixel position $(u_{m+4}, v_n)$ of a pixel in the distance image at a time when the movement direction of pixels in the luminance image, which correspond to the pixels in the distance image, becomes opposite to the one direction, is set as a pixel position at which an occlusion starts, the starting pixel of the occlusion region can be searched for with high accuracy. Moreover, because a pixel position $(u_{m+5}, v_n)$ of a pixel in the distance image immediately before a pixel position $(UA(u_i), UA(v_j))$ of a pixel in the luminance image A, which corresponds to the pixel in the distance image, becomes on the side of the one direction from a pixel position $(UA(u_{m+3}), UA(v_n))$ of a pixel in the luminance image A immediately before the movement direction changes is set as a pixel position at which the occlusion region ends in the one direction, the ending pixel of the occlusion region can be searched for with high accuracy.

Using the correspondence relationship between pixel positions $(u_i, v_j)$ in the distance image and pixel positions $(UA(u_i), UA(v_j))$ in the luminance image A, luminance information of pixels in the luminance image A that correspond to such pixels are mapped to distance information of pixels in the distance image outside of the occlusion region. Thus, a distance image having luminance information therein can be obtained.

At least two CCD cameras 12a, 12b are provided, wherein the mapping unit 26 maps luminance information of corresponding pixels of the luminance image B captured by the CCD camera 12b to distance information of pixels of the occlusion region in the distance image, which have been searched for by the occlusion searching unit 28 using the luminance image A captured by the CCD camera 12a. Therefore, the occlusion region with respect to the luminance image A can be compensated using the luminance information captured by the other CCD camera 12b, and even if an occlusion region is generated, a clean three-dimensional image can be obtained.

In the above-described embodiment, the TOF camera 10, the CCD camera 12a, and the CCD camera 12b are disposed substantially horizontally with respect to the ground surface. However, the TOF camera 10, the CCD camera 12a, and the CCD camera 12b may be disposed in a vertical direction with respect to the ground surface. In this case, the scanning direction during occlusion searching is not sideways (horizontal) direction, but rather is a vertical direction. Stated otherwise, the scanning direction during occlusion searching is a direction, which is the same as the direction in which the TOF camera 10, the CCD camera 12a, and the CCD camera 12b are disposed. Even in the case that the TOF camera 10, the CCD camera 12a, and the CCD camera 12b are disposed vertically with respect to the ground surface, the TOF camera 10 is disposed between the CCD camera 12a and the CCD camera 12b.

Further, in the above-described embodiment, although two CCD cameras 12 are provided, a single CCD camera 12 may be used. In this case, within the distance image obtained by the TOF camera 10, in the event there is an occlusion region where the CCD camera 12 cannot capture images, predetermined luminance information is mapped to the distance information of pixels in that region, while in addition, luminance information of the luminance image obtained by the CCD camera 12 is mapped to distance information of pixels outside of the occlusion region. Further, the number of CCD cameras is not limited to two, but may be three or greater.

A preferred embodiment of the present invention has been described above, however, the technical field of the present invention is not limited to the field described in the preferred embodiment. It will be apparent to those skilled in the art that various modifications and additions could be made to the above-described embodiment. The fact that implementations in which such various modifications and additions are provided are included within the technical field of the present invention is made clear from the scope of the appended claims.

What is claimed is:

1. An image capturing device comprising:
a distance image sensor;
at least two luminance image sensors;
an external parameter estimating unit for estimating external parameters using a distance image obtained by the distance image sensor and a luminance image obtained by the luminance image sensor;
a corresponding pixel determining unit for determining a correspondence relationship between pixel positions in the distance image and pixel positions in the luminance image, using previously stored internal parameters of the distance image sensor and the luminance image sensor, and the external parameters; and
an occlusion searching unit for searching for an occlusion region in the distance image, using the correspondence relationship between pixel positions in the distance image and pixel positions in the luminance image determined by the corresponding pixel determining unit.

2. The image capturing device according to claim 1, wherein the occlusion searching unit scans the pixels in the distance image in one direction, and sets, as a pixel position at which the occlusion starts, a pixel position of the pixels in the distance image at a time when a movement direction of pixels in the luminance image, which correspond to the pixels in the distance image, becomes opposite to the one direction.

3. The image capturing device according to claim 2, wherein the occlusion searching unit sets, as a pixel position at which the occlusion in the one direction ends, a pixel position of pixels in the distance image immediately before the pixel position of pixels in the luminance image, which correspond to the pixels in the distance image, become on the side of the one direction from a pixel position of pixels in the luminance image immediately before the movement direction changes.

4. The image capturing device according to claim 1, further comprising a mapping unit for mapping luminance information of pixels of the luminance image, which correspond to pixels in the distance image, to distance information of pixels in the distance image outside of the occlusion region, using the correspondence relationship between pixel positions in the distance image and pixel positions in the luminance image.

5. The image capturing device according to claim 4, comprising at least two of the luminance image sensors, wherein the mapping unit maps to distance information of the pixels of the occlusion region in the distance image, which have been searched for by the occlusion searching unit, using the luminance image captured by one of the luminance image sensors, luminance information of corresponding pixels of the luminance image captured by the other luminance image sensor.

6. An occlusion region searching method implemented by a computer having a distance image sensor and at least two luminance image sensors, comprising the steps of:

estimating external parameters using a distance image obtained by the distance image sensor and a luminance image obtained by the luminance image sensor;

determining a correspondence relationship between pixel positions in the distance image and pixel positions in the luminance image, using previously stored internal parameters of the distance image sensor and the luminance image sensor, and the external parameters; and searching for an occlusion region in the distance image, using the determined correspondence relationship between pixel positions in the distance image and pixel positions in the luminance image.

7. A non-transitory computer readable medium storing instructions that, when executed by one or more processors, cause the one or more processors to enable a computer having a distance image sensor and at least two luminance image sensors to function as:

an external parameter estimating unit for estimating external parameters using a distance image obtained by the distance image sensor and a luminance image obtained by the luminance image sensor;

a corresponding pixel determining unit for determining a correspondence relationship between pixel positions in the distance image and pixel positions in the luminance image, using previously stored internal parameters of the distance image sensor and the luminance image sensor, and the external parameters; and an occlusion searching unit for searching for an occlusion region in the distance image, using the correspondence relationship between pixel positions in the distance image and pixel positions in the luminance image determined by the corresponding pixel determining unit.

* * * * *